(12) United States Patent
Watanabe et al.

(10) Patent No.: US 11,253,944 B2
(45) Date of Patent: Feb. 22, 2022

(54) METHOD FOR JOINING DISSIMILAR MATERIALS, AND DISSIMILAR-MATERIAL JOINED BODY

(71) Applicant: KABUSHIKI KAISHA KOBE SEIKO SHO (KOBE STEEL, LTD)., Hyogo (JP)

(72) Inventors: Kenichi Watanabe, Kobe (JP); Reiichi Suzuki, Fujisawa (JP); Hideto Katsuma, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 248 days.

(21) Appl. No.: 16/477,714

(22) PCT Filed: Jan. 10, 2018

(86) PCT No.: PCT/JP2018/000354
§ 371 (c)(1),
(2) Date: Jul. 12, 2019

(87) PCT Pub. No.: WO2018/142859
PCT Pub. Date: Aug. 9, 2018

(65) Prior Publication Data
US 2019/0358732 A1    Nov. 28, 2019

(30) Foreign Application Priority Data

Feb. 1, 2017 (JP) .............................. JP2017-016954

(51) Int. Cl.
*B23K 11/11* (2006.01)
*B23K 11/20* (2006.01)
(Continued)

(52) U.S. Cl.
CPC .............. *B23K 11/11* (2013.01); *B23K 11/20* (2013.01); *B23K 26/22* (2013.01); *B23K 37/04* (2013.01); *B23K 2103/20* (2018.08)

(58) Field of Classification Search
CPC ..... B23K 11/11; B23K 11/20; B23K 2103/20; B23K 26/21; B23K 26/22; B23K 26/348; B23K 37/04; B23K 9/16
(Continued)

(56) References Cited

U.S. PATENT DOCUMENTS 3,774,009 A    11/1973    Hodges
6,291,792 B1    9/2001    Fussnegger et al.
(Continued)

FOREIGN PATENT DOCUMENTS

JP    2002174219 A    6/2002
JP    2010-240678 A    10/2010
JP    4634990 B2    2/2011

OTHER PUBLICATIONS

Notification Concerning Transmittal of International Preliminary Report on Patentability (Chapter 1) and Translation of Written Opinion of the International Searching Authority; PCT/JP2018/000354; dated Aug. 15, 2019.
(Continued)

*Primary Examiner* — Dana Ross
*Assistant Examiner* — Joseph W Iskra
(74) *Attorney, Agent, or Firm* — Studebaker & Brackett PC

(57) ABSTRACT

A steel plate frame and a thin plate are made of different materials. A plurality of through holes are formed in a portion of the thin plate to be placed on the steel plate frame. A plurality of projections 6c are formed on a support plate, each of the projections being allowed to be inserted into a corresponding one of the through holes. An adhesive is applied to a portion of the steel plate frame on which the thin plate is placed. The thin plate is placed on the steel plate frame, and the steel plate frame and the thin plate are bonded together by the adhesive. The support plate is placed on the thin plate to insert the projections into the through holes. The projections and the steel plate frame are welded to form a plurality of welded spots.

12 Claims, 23 Drawing Sheets

(51) Int. Cl.
*B23K 26/22* (2006.01)
*B23K 37/04* (2006.01)
*B23K 103/20* (2006.01)

(58) Field of Classification Search
USPC .................................................... 219/117.1
See application file for complete search history.

(56) References Cited

U.S. PATENT DOCUMENTS

| | | |
|---|---|---|
| 7,819,452 B2 | 10/2010 | Fuchs et al. |
| 2009/0188206 A1* | 7/2009 | Stol ................. B23K 31/027 |
| | | 52/762 |
| 2009/0278371 A1 | 11/2009 | Fuchs et al. |
| 2015/0000956 A1* | 1/2015 | Spinella ............. B23K 11/34 |
| | | 174/126.2 |

OTHER PUBLICATIONS

International Search Report issued in PCT/JP2018/000354; dated Mar. 13, 2018.

The extended European search report issued by the European Patent Office dated Nov. 13, 2020, which corresponds to European Patent Application No. 18747574.4-1016 and is related to U.S. Appl. No. 16/477,714.

\* cited by examiner

METHOD FOR JOINING DISSIMILAR MATERIALS, AND DISSIMILAR-MATERIAL JOINED BODY

CROSS-REFERENCE TO RELATED APPLICATIONS

This is a national phase application in the United States of International Patent Application No. PCT/JP2018/000354 with an international filing date of Jan. 10, 2018, which claims priority of Japanese Patent Application No. 2017-016954 filed on Feb. 1, 2017 the contents of which are incorporated herein by reference.

TECHNICAL FIELD

The present invention relates to a method for joining dissimilar materials and a dissimilar-material joined body.

JP 2002-174219 A discloses a method for joining an aluminum thin plate to a steel frame using a self-piercing rivet.

BACKGROUND ART

Patent Document 1 discloses a method for joining an aluminum thin plate to a steel frame using a self-piercing rivet.

SUMMARY OF THE INVENTION

Problems to be Solved by the Invention

The method for joining dissimilar materials using the rivet disclosed in JP 2002-174219 A cannot produce high joining strength. Specifically, a steel frame and an aluminum thin plate are joined together only with rivets, and thus, when a load is applied to the thin plate, stress concentration occurs on the thin plate around the rivets. This stress concentration may cause the rivets to fracture or come off, and cause a portion of the thin plate between riveted points adjacent to each other to fracture. Further, an increase in the number of riveted points in order to prevent the rivets from fracturing or coming off reduces a distance between the riveted points adjacent to each other and accordingly makes the thin plate susceptible to fracture.

An object of the present invention is to increase a joining strength produced by a method for joining dissimilar materials and of a dissimilar-material joined body.

Means for Solving the Problems

Provided according to a first aspect of the present invention is a method for joining dissimilar materials for joining an overlap section between a first metal member and a second metal member different in material from the first metal member, the method including forming a plurality of through holes in a portion of the second metal member to be placed on the first metal member, forming a plurality of projections on a support member, each of the plurality of projections being allowed to be inserted into a corresponding one of the through holes, applying a first adhesive to a portion of the first metal member on which the second metal member is placed or to a portion of the second metal member to be placed on the first metal member, placing the second metal member on the first metal member to bond the first metal member and the second metal member together with the first adhesive, placing the support member on the second metal member to insert the plurality of projections into the through holes, and welding each of the plurality of projections to the first metal member to form a plurality of welded spots.

The second metal member is continuously or widely pressed against the first metal member by the support member between the welded spots adjacent to each other. This reduces stress concentration around each of the welded spots.

Pressing the second metal member continuously or widely against the first metal member with the support member between the welded spots adjacent to each other prevents the second metal member from undergoing out-of-plane deformation. Further, the second metal member is bonded to the first metal member by a first adhesive. These also reduce stress concentration around each of the welded spots.

The above stress concentration reduction makes the second metal member less susceptible to fracture from a portion joined to the first metal member when a load is applied to the second metal member and thus makes it possible to increase a joining strength between the first metal member and the second metal member.

A second adhesive may be applied to the second metal member or to the support member to bond the second metal member and the support member together with the second adhesive.

Bonding the support member to the second metal member with the second adhesive reduces stress concentration around each of the welded spots more effectively and thus makes it possible to further increase the joining strength between the first metal member and the second metal member.

For example, the first metal member is a long member whose cross section orthogonal to a longitudinal direction has a U shape, a hat shape, a rectangular shape, or a circular shape, the second metal member is a plate-shaped member, and the support member is a long strip-shaped member.

The first adhesive bonds the first metal member and the second metal member together between the welded spots adjacent to each other.

Alternatively, the second metal member includes a first portion that is placed on the first metal member, in which the plurality of through holes are formed, and on which the support member is placed, and a second portion that is not flush with the first portion and is placed on a portion of the first metal member that is different from a portion on which the first portion is placed, and the first adhesive is applied to the portion of the first metal member on which the second portion is placed or to a portion of the second portion to be placed on the first metal member.

The second metal member includes the first portion and the second portion that is not flush with the first portion, and the second portion of the second metal member in which no through hole is formed is bonded to the first metal member with the first adhesive. This allows a bonding surface constituted by the first adhesive to be continuous to increase a bonding area, and thus makes it possible to reduce stress concentration around each of the welded spots more effectively and further increase the joining strength between the first metal member and the second metal member.

For example, the first portion and the second portion each have a flat-plate shape, and the first portion and the second portion are connected to each other with a bent portion interposed between the first portion and the second portion.

Alternatively, a cross section of the first metal member orthogonal to the longitudinal direction has a circular shape, the first portion of the second metal member has a curved-plate shape along a contour of the first metal member, and the second portion of the second metal member has a flat-plate shape.

Since the first portion of the second metal member has a curved-plate shape and extends along the contour of the first metal member having a circular shape, it is possible to effectively prevent moisture ingress into a gap between the first portion of the second metal member and the first metal member. This in turn makes it possible to prevent electrical contact between the first metal member and the second metal member.

A cross section of the support plate orthogonal to the longitudinal direction may have an arc shape along the first portion of the second metal member.

This makes it possible to effectively prevent moisture ingress into a gap between the support member and the first portion of the second metal member. This in turn makes it possible to prevent electrical contact between the support member and the second metal member. Further, the support member has no sharp edge projecting from the second portion of the second metal member, and thus safety is increased.

For example, the first metal member is made of steel, the second metal member is made of aluminum or an aluminum alloy, and the support member is made of steel.

The first metal member and the projections of the support member are welded together by resistance spot welding, laser welding, arc welding, or laser arc welding.

The projections of the support member are formed by deep drawing, bulging, forging, or cutting.

Provided according to a second aspect of the present invention is a dissimilar-material joined body including at least two first metal members that are each a long member made of steel and whose cross section orthogonal to a longitudinal direction has a U shape, a hat shape, a rectangular shape, or a circular shape, a second metal member that is a thin plate made of aluminum or an aluminum alloy and is placed on each of the first metal members, a support member that is made of steel and is placed on a portion of the second metal member placed on each of the first metal members, an adhesive layer that bonds the first metal member and the second metal member together, and a plurality of welded spots where each of a plurality of projections formed on the support member and inserted into a corresponding one of a plurality of through holes formed in the second metal member is welded to the first metal member.

Effects of the Invention

The method for joining dissimilar materials and the dissimilar-material joined body according to the present invention allow an increase in joining strength between the first metal member and the second metal member made of different materials.

MODE FOR CARRYING OUT THE INVENTION

First Embodiment

FIGS. 1 to 4 show a frame structure (dissimilar-material joined body) 1 manufactured by a method for joining dissimilar materials according to a first embodiment of the present invention. The application of this frame structure 1 is not limited to a particular field, and the frame structure 1 is applicable to a vehicle seat frame or a panel structure such as a floor.

Figure 1:
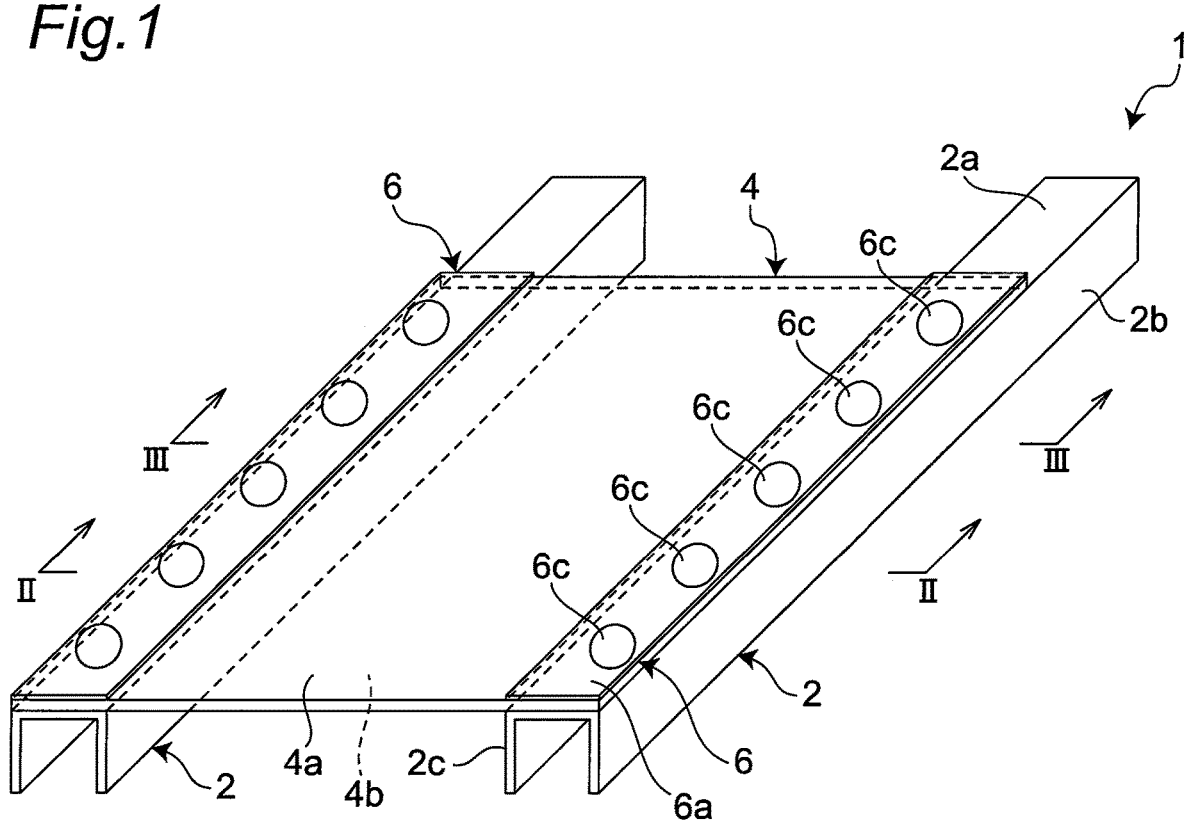
FIG. 1 is a schematic perspective view of a frame structure manufactured by a method for joining dissimilar materials according to a first embodiment.

The frame structure 1 includes a pair of steel frames (first metal members) 2 that are long members made of steel such as high tensile strength steel, and a thin plate (second metal member) 4 made of aluminum or an aluminum alloy. Both left and right ends of the thin plate 4 in FIG. 1 are placed on and joined to the steel frames 2. A support plate (support member) 6 that is a long strip-shaped steel member is placed on each of the portions of the thin plate 4 placed on the left and right steel frames 2. In the present embodiment, a cross section of the support plate 6 orthogonal to a longitudinal direction has a slender rectangular shape, and both surfaces 6a, 6b of the support plate 6 are flat. In the drawings related to the present embodiment except FIG. 1 and the drawings related to the second and third embodiments to be described later, only a section where the thin plate 4 and the right steel frame 2 are joined to each other in FIG. 1 is illustrated.

Each of the steel frames 2 in the present embodiment has a U shape in cross section orthogonal to the longitudinal direction, and includes a top wall 2a and a pair of side walls 2b, 2c extending downward in the drawings from both ends of the top wall 2a. The thin plate 4 is placed on the top wall 2a.

Figure 2:
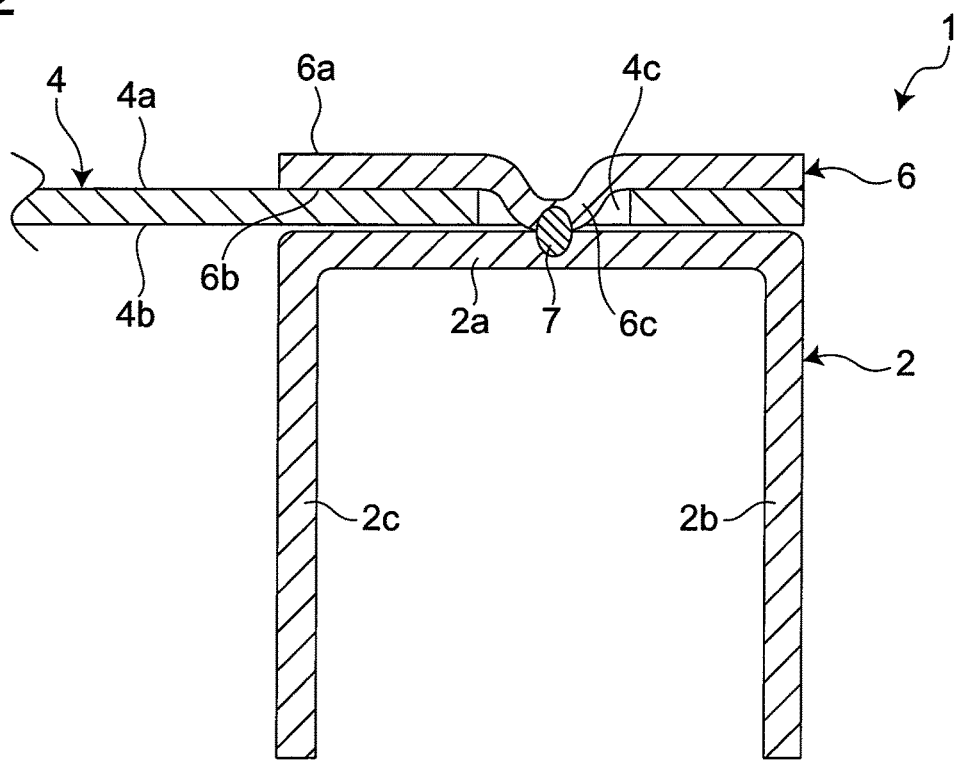
FIG. 2 is a cross-sectional view taken along line II-II of FIG. 1.
Figure 4:
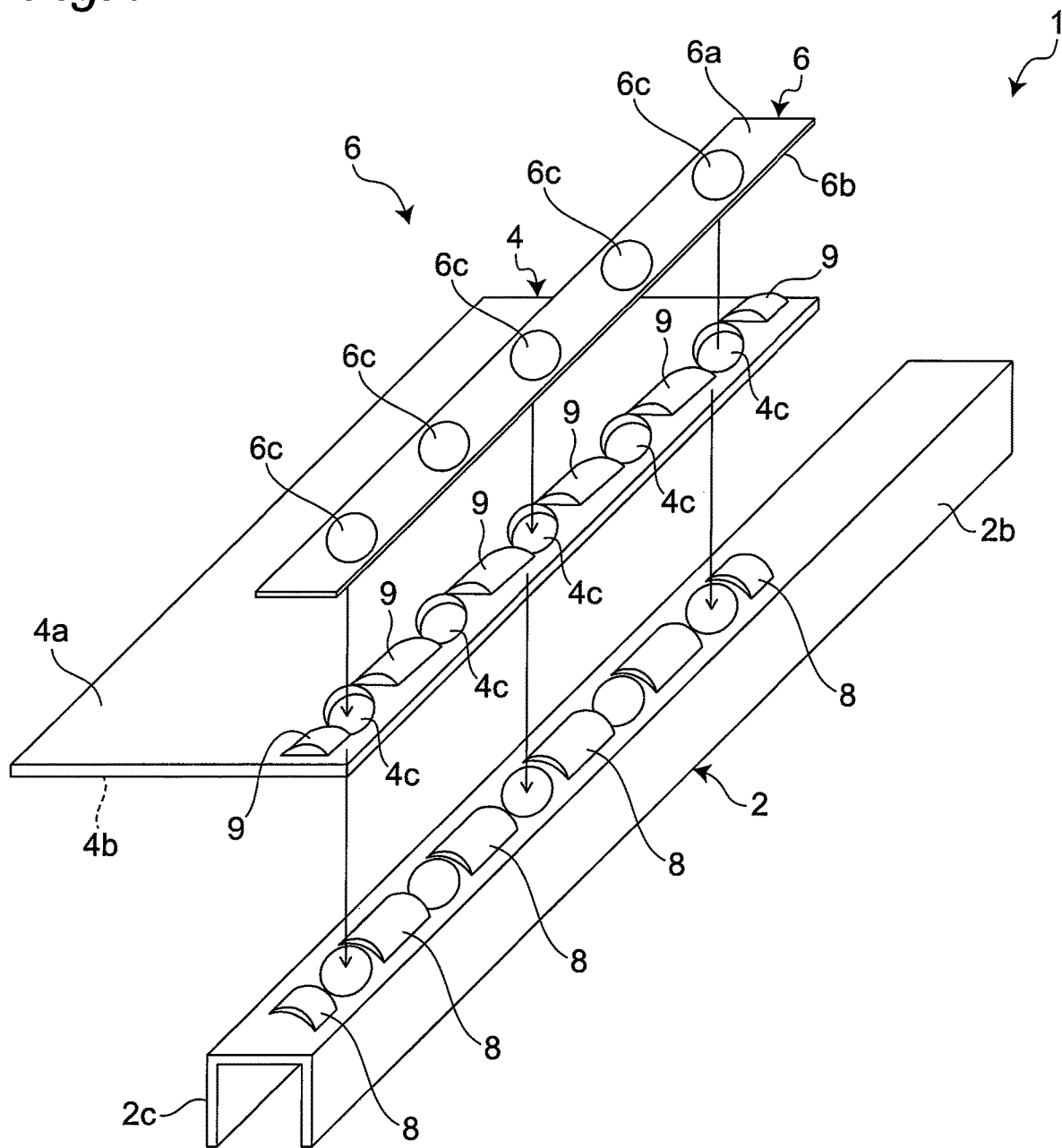
FIG. 4 is an exploded perspective view of the frame structure of FIG. 1.

Referring to FIGS. 2 and 4, in a portion of the thin plate 4 that is placed on the top wall 2a of the steel frame 2, a plurality of (in the present embodiment, five) through holes 4c penetrating the thin plate 4 from a surface 4a on an upper side in the drawings to a surface 4b on a lower side in the drawings are formed spaced apart from one another. In the present embodiment, the plurality of through holes 4c are arranged on a straight line extending in the longitudinal direction of the steel frame 2. A shape of the through holes 4c is circular in the present embodiment, but is not limited to a particular shape as long as the through holes 4c can receive projections 6c to be described later.

Figure 5:
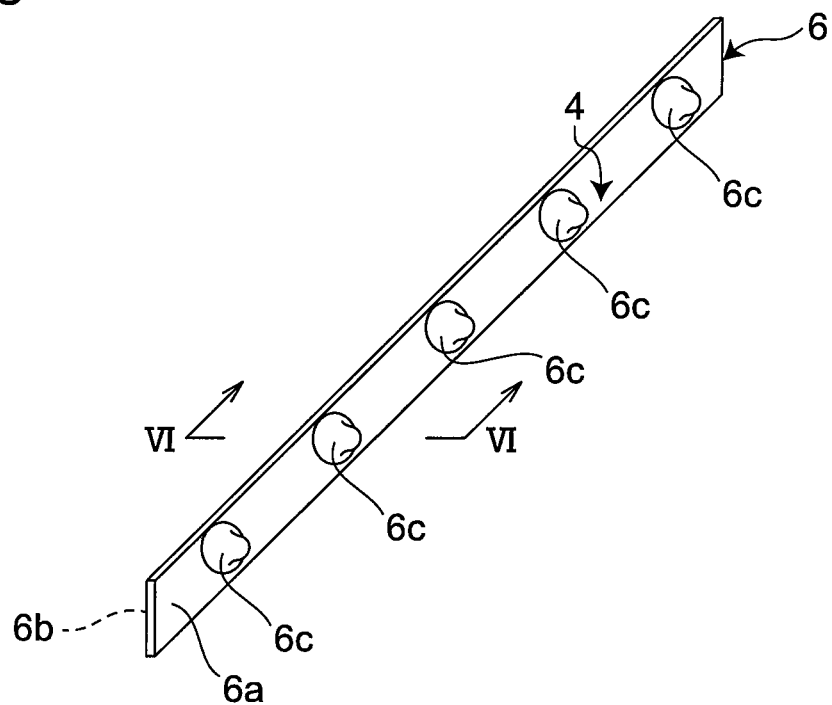
FIG. 5 is a perspective view of a support plate.

Referring to FIG. 5 together, on the support plate 6, a plurality of (in the present embodiment, five) projections 6c projecting from the surface 6a placed on the thin plate 4 are formed spaced apart from one another in the longitudinal direction. In the present embodiment, the projections 6c are arranged on a straight line extending in the longitudinal direction of the steel frame 2 as with the through holes 4c. As shown in FIG. 2, each of the projections 6c is inserted into a corresponding one of the through holes 4c. In other words, the numbers of and the spacing between the through holes 4c and the projections 6c are set such that each of the projections 6c aligns with a corresponding one of the through holes 4c. A tip of each of the projections 6c is in contact with an outer surface of the top wall 2a of the steel frame 2. A welded spot 7 is formed between the tip of the projection 6c and the top wall 2a of the steel frame 2. In other words, the support plate 6 is joined to the top wall 2a of the steel frame 2 by the welded spot 7 with the thin plate 4 sandwiched between the support plate 6 and the top wall 2a of the steel frame 2.

In the present embodiment, one common support plate 6 is provided for the five through holes 4c arranged in the longitudinal direction of the steel frame 2. However, the support plate 6 may be divided into two or more pieces.

Figure 3:
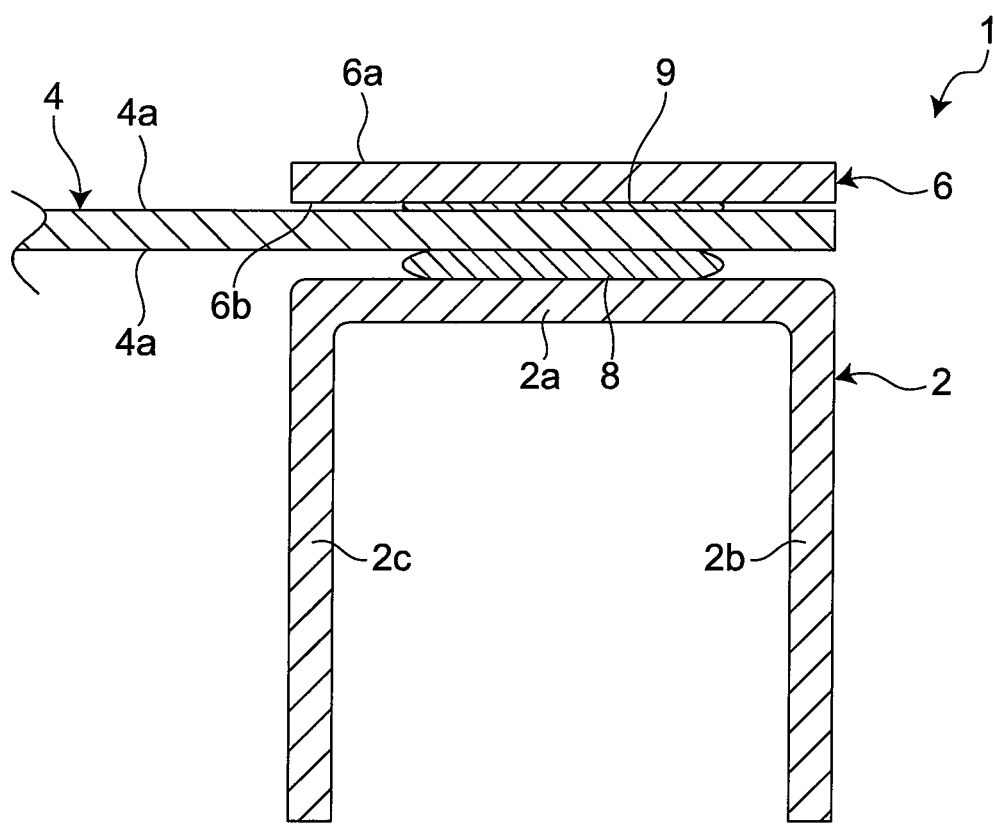
FIG. 3 is a cross-sectional view taken along line of FIG. 1.

Referring to FIGS. 3 and 4, a plurality of adhesive layers 8 are formed between the outer surface of the top wall 2a of the steel frame 2 and the surface 4a of the thin plate 4 facing the top wall 2a of the steel frame 2. The surface 4a of the thin plate 4 and the outer surface of the top wall 2a of the steel frame 2 are bonded to each other by the adhesive layers 8 (first adhesive). As shown in FIG. 4, in the present embodiment, one adhesive layer 8 is disposed between the through holes 4c adjacent to each other. In other words, one long and narrow adhesive layer 8 provided continuously in the longitudinal direction of the steel frame 2 is divided, at a position corresponding to each of the through holes 4c, into pieces, thereby forming the adhesive layers 8 in the present embodiment.

Still referring to FIGS. 3 and 4, a plurality of adhesive layers 9 are formed between the surface 4a on the upper side in the drawings of the thin plate 4 and the surface 6a of the support plate 6 from which the projections 6c project. The surface 6a of the support plate 6 and the surface 4a of the thin plate 4 are bonded to each other by the adhesive layers 9 (second adhesive). As shown in FIG. 4, in the present embodiment, one adhesive layer 9 is disposed between the through holes 4c adjacent to each other. In other words, one long and narrow adhesive layer 9 provided continuously in the longitudinal direction of the steel frame 2 is divided, at a position corresponding to each of the through holes 4c, into pieces thereby forming the adhesive layers 9 in the present embodiment.

The frame structure 1 of the present embodiment has the following features.

The thin plate 4 is pressed, between the welded spots 7 adjacent to each other, continuously or widely against the steel frame 2 by the support plate 6. This reduces stress concentration around each of the welded spots 7.

Pressing the thin plate 4 continuously or widely against the steel frame 2 with the support plate 6 between the welded spots 7 adjacent to each other prevents the thin plate 4 from undergoing out-of-plane deformation. Further, the thin plate 4 is bonded to the steel frame 2 by the adhesive layers 8. This also reduces the stress concentration around the each of the welded spots 7.

The above stress concentration reduction makes the thin plate 4 less susceptible to fracture from a portion joined to the steel frame 2 when a load is applied to the thin plate 4 and thus makes it possible to increase a joining strength between the steel frame 2 and the thin plate 4. That is, although a weight of the frame structure 1 is reduced by a combination of the steel frame 2 and the thin plate 4 made of aluminum or an aluminum alloy, sufficient rigidity is secured.

In the present embodiment, bonding the support plate 6 to the thin plate 4 with the adhesive layers 9 makes it possible to more effectively reduce stress concentration around each of the welded spots 7 and further increase the joining strength between the steel plate frame 2 and the thin plate 4.

Next, a description will be given of a method for joining dissimilar materials according to the present embodiment.

The through holes 4c are formed in the thin plate 4. The through holes 4c can be formed by stamping. Specifically, with both the surfaces 4a, 4b of the thin plate 4 sandwiched between a die and a blank holder, forcing a punch through the thin plate 4 creates the through holes 4c.

Figure 6:
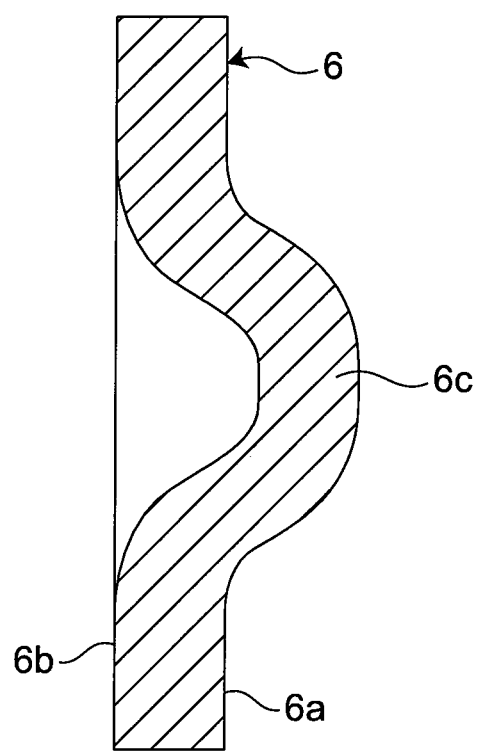
FIG. 6 is a cross-sectional view taken along line VI-VI of FIG. 5.
Figure 7:
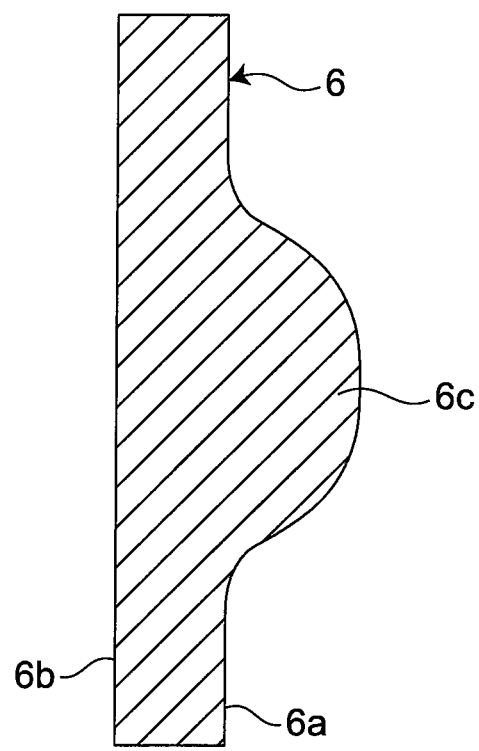
FIG. 7 is a cross-sectional view, similar to FIG. 6, of another form of a projection.

The projections 6c are formed on the support plate 6. In the present embodiment, the projections 6c are formed by deep drawing or bulging. Accordingly, as shown in FIG. 6, a recess is formed at a position corresponding to each of the projections 6c on the surface 6b of the support plate 6 opposite to the surface 6a from which the projections 6c project. Although deep drawing or bulging is preferable in that the processing cost can be reduced, the projections 6a may be formed by other methods such as forging or cutting. When the projections 6a are formed by forging or cutting, no recess is formed on the surface 6b of the support plate 6 opposite to the surface 6a from which the projections 6c project as shown in FIG. 7.

External dimensions of the projections 6c need to be set so as to allow the projections 6c to be inserted into the through holes 4c of the thin plate 4. A dimension of each of the projections 6 (a height of the projection 6) from the surface 6a of the support plate 6 to the tip of the projection 6c needs to be set such that the tip of the projection 6c comes into contact with the outer surface of the top wall 2a when the support plate 6 is placed on the thin plate 4 placed on the top wall 2a of the steel frame 2 to insert the projection 6c into a corresponding one of the through holes 4c.

The process of forming the through holes 4c in the thin plate 4 and the process of forming the projections 6c on the support plate 6 may be performed sequentially in that order or reverse order. Further, the two processes may be performed simultaneously or in parallel.

Next, an adhesive (first adhesive) is applied to a portion of the outer surface of the top wall 2a of the steel frame 2 on which the thin plate 4 is placed to form the adhesive layers 8. Examples of the adhesive used for the adhesive layers 8 include an epoxy-based adhesive, a urethane-based adhesive, and an acrylic-based adhesive. The adhesive may be applied to a portion of the surface 4b on the lower side in the drawings of the thin plate 4 to be placed on the outer surface of the top wall 2a of the steel frame 2 to form the adhesive layers 8.

After the adhesive layers 8 are formed, the surface 4b on the lower side in the drawings of the thin plate 4 is placed on the outer surface of the top wall 2a of the steel frame 2, and the steel frame 2 and the thin plate 4 are bonded to each other by the adhesive layers 8.

Next, an adhesive (second adhesive) is applied to the surface 6a of the support plate 6 from which the projections 6c project to form the adhesive layers 9. Examples of the adhesive used for the adhesive layers 9 include an epoxy-based adhesive, a urethane-based adhesive, and an acrylic-based adhesive. The adhesive may be applied to a portion of the surface 4a on the upper side in the drawings of the thin plate 4 on which the support plate 6 is placed to form the adhesive layers 9.

After the adhesive layers 9 are formed, the surface 6a of the support plate 6 is placed on the surface 4a on the upper side in the drawings of the thin plate 4, and the thin plate 4 and the support plate 6 are bonded to each other by the adhesive layers 9. When the support plate 6 is placed on the thin plate 4, each of the projections 6 of the support plate 6 is inserted into a corresponding one of the through holes 4c of the thin plate 4.

Figure 8:
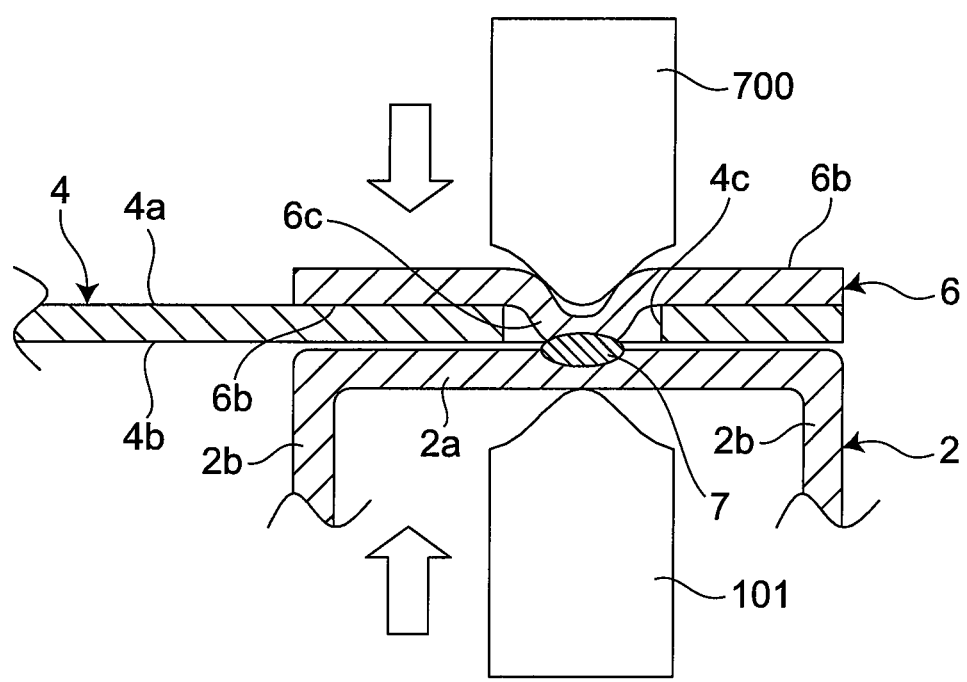
FIG. 8 is a cross-sectional view for describing resistance spot welding in the first embodiment.
Figure 9:
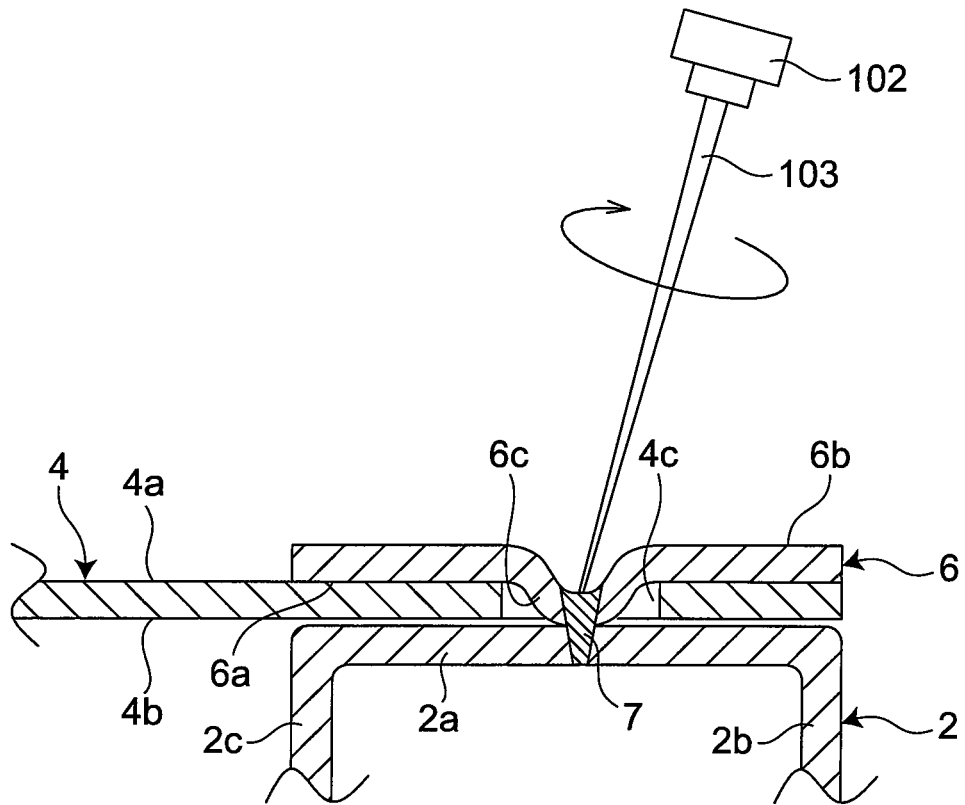
FIG. 9 is a cross-sectional view for describing laser welding in the first embodiment.

Next, the projections 6a of the support plate 6 are welded to the top wall 2a of the steel frame 2. Examples of this welding include resistance spot welding, laser welding, arc welding, and laser arc welding. As conceptually shown in FIG. 8, for the resistance spot welding, a portion, corresponding to the projection 6a, of the support plate 6 and a portion, opposite to the projection 6a, of the top wall 2a of the steel frame 2 are sandwiched between electrodes 100, 101. An electric current is applied under pressure applied by the electrodes 100, 101 to cause an energized section to be partially melted by heat generated due to contact resistance and then solidified to become the welded spot 7. As conceptually shown in FIG. 9, for the laser welding, a laser beam 103 emitted from a light source 102 causes an irradiated section to be partially melted and then solidified to become the welded spot 7.

Through the above processes, the frame structure 1 shown in FIG. 1 is manufactured.

FIGS. 10 to 17 show various modifications of the first embodiment.

Figure 10:
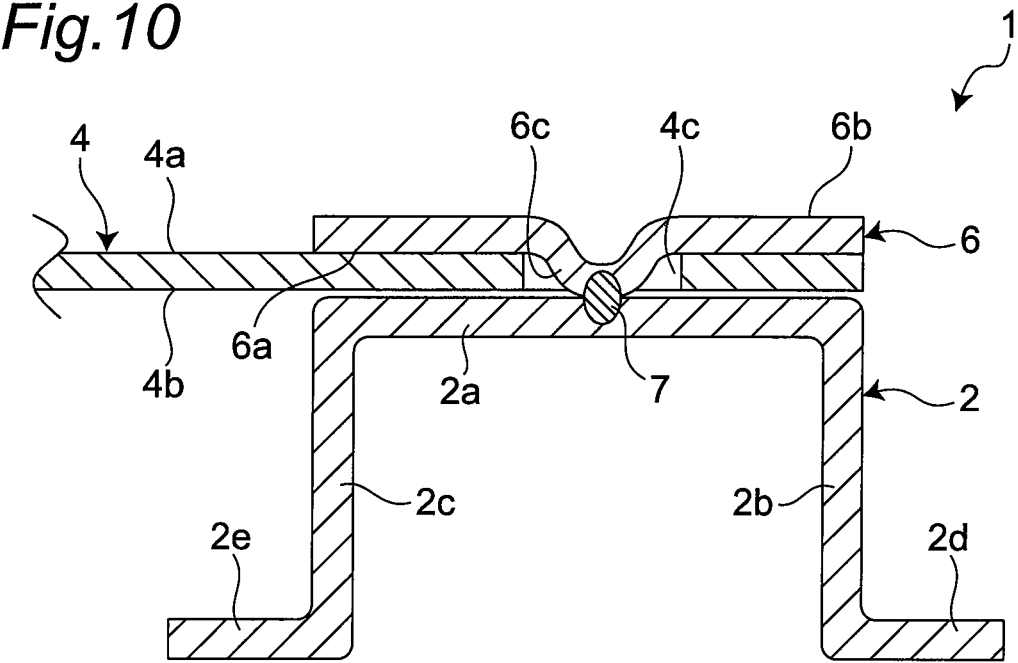
FIG. 10 is a cross-sectional view, similar to FIG. 2, of a frame structure according to a first modification of the first embodiment.
Figure 11:
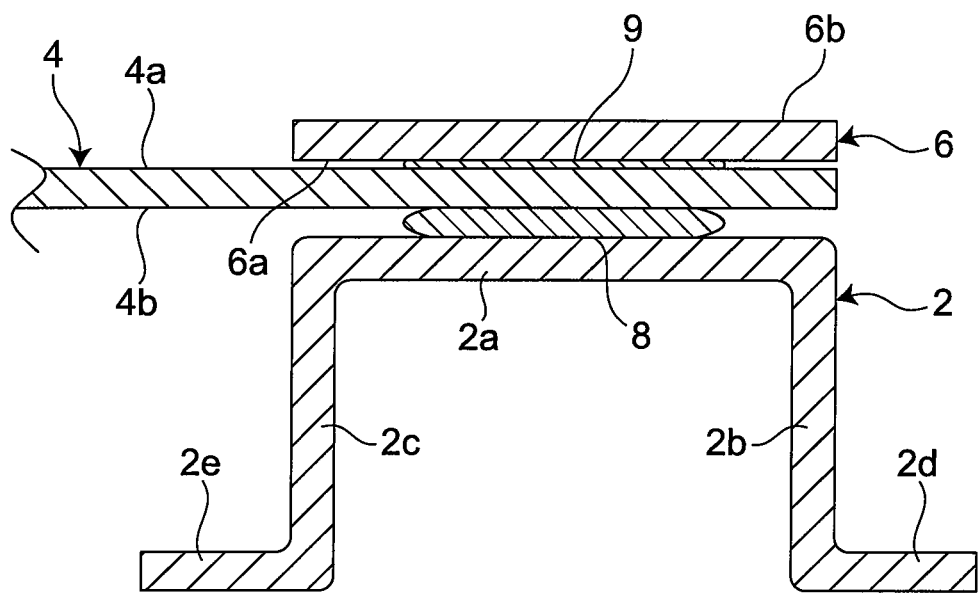
FIG. 11 is a cross-sectional view, similar to FIG. 3, of the frame structure according to the first modification of the first embodiment.

In a first modification shown in FIGS. 10 and 11, the cross section of the steel plate frame 2 orthogonal to the longitudinal direction has a hat shape. That is, in addition to the top wall 2a and the side walls 2b, 2c, the steel plate frame 2 includes flanges 2d, 2e extending in a lateral direction from lower ends in the drawings of the side walls 2b, 2c, respectively.

Figure 12:
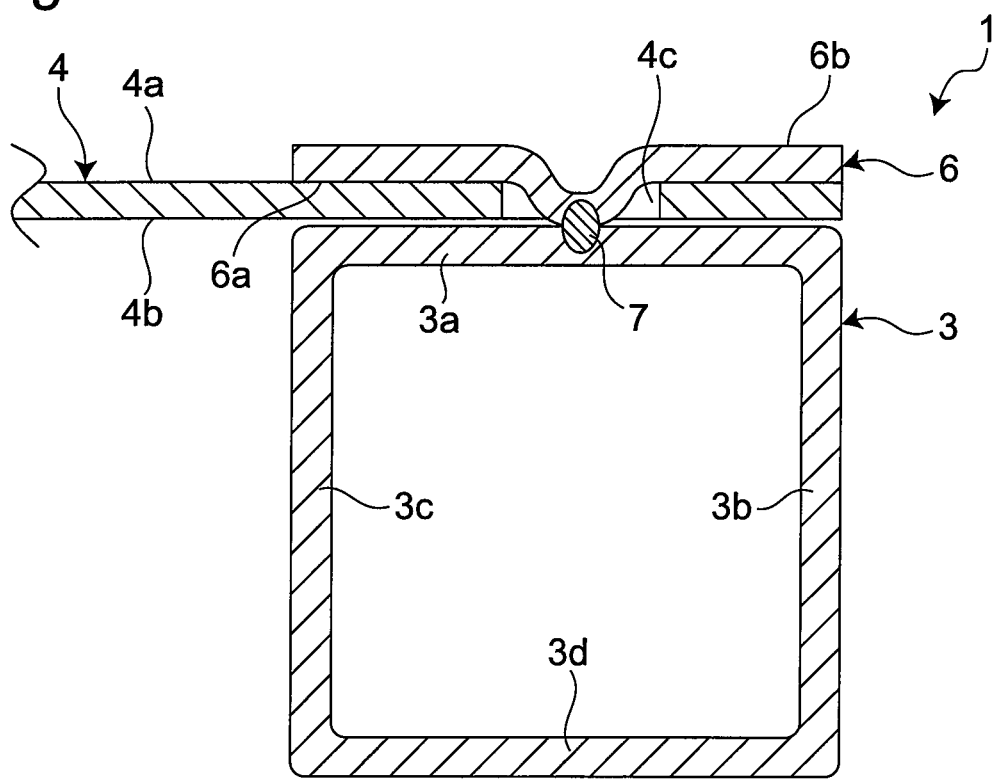
FIG. 12 is a cross-sectional view, similar to FIG. 2, of a frame structure according to a second modification of the first embodiment.
Figure 13:
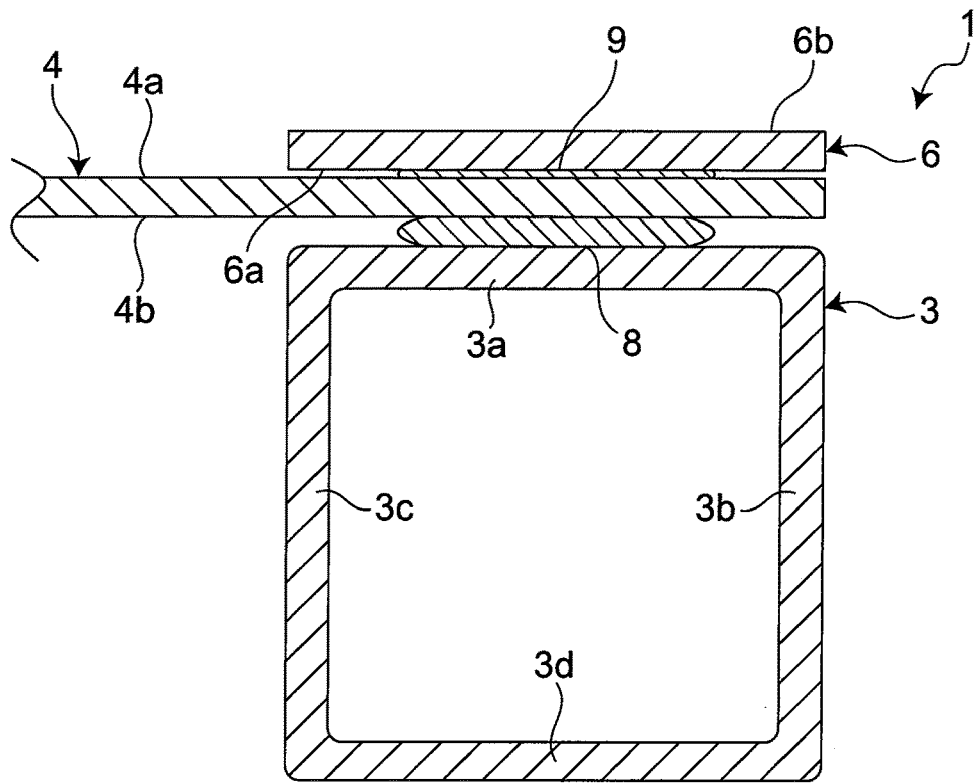
FIG. 13 is a cross-sectional view, similar to FIG. 3, of the frame structure according to the second modification of the first embodiment.
Figure 14:
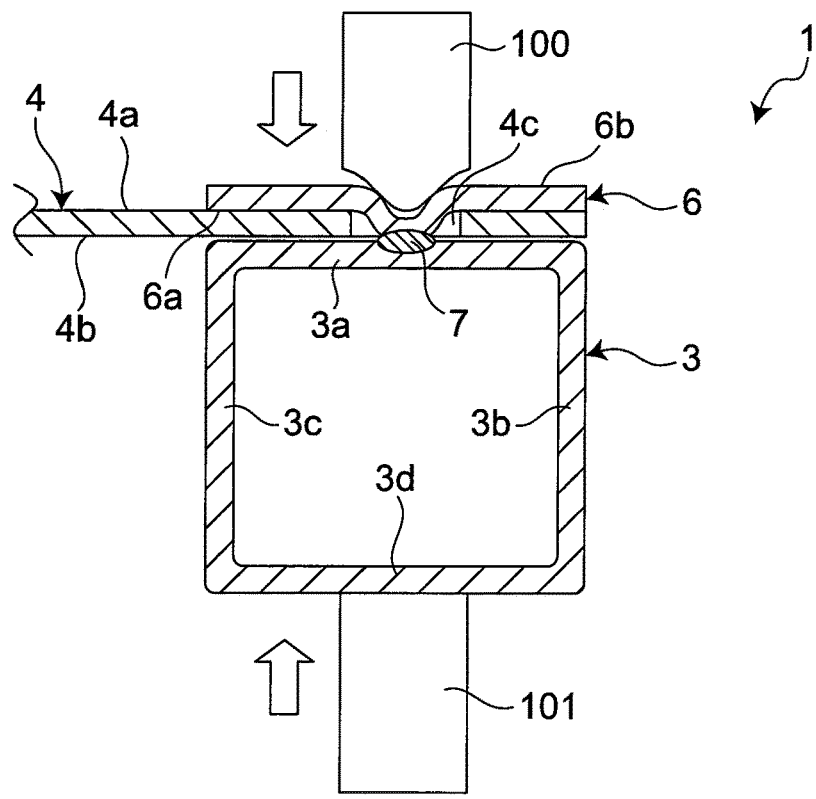
FIG. 14 is a cross-sectional view for describing resistance spot welding in the second modification of the first embodiment.

In a second modification shown in FIGS. 12 and 13, instead of the steel plate frame 2, the thin plate 4 is joined to a steel pipe 3 (rectangular steel pipe) whose cross section orthogonal to the longitudinal direction has a rectangular shape. The steel pipe 3 includes a top wall 3a, side walls 3b, 3c extending downward in the drawings from both ends of the top wall 3a, and a bottom wall 3d connecting ends on lower sides in the drawings of the side walls 3b, 3c. The welded spot 7 is formed between each of the projections 6c of the support plate 6 and the top wall 3a of the steel pipe 3. Further, the surface 4b on the lower side in the drawings of the thin plate 4 and the top wall 3a of the steel pipe 3 are bonded to each other by the adhesive layers 8. As conceptually shown in FIG. 14, in a case where the welded spot 7 is formed by the spot resistance welding, one electrode 100 is disposed at a position on the surface 6b of a reinforcing plate 6 corresponding to the projection 6c, and the other electrode 101 is disposed at a position on the bottom wall 3d of the steel pipe 3 opposite to the projection 6c.

Figure 15:
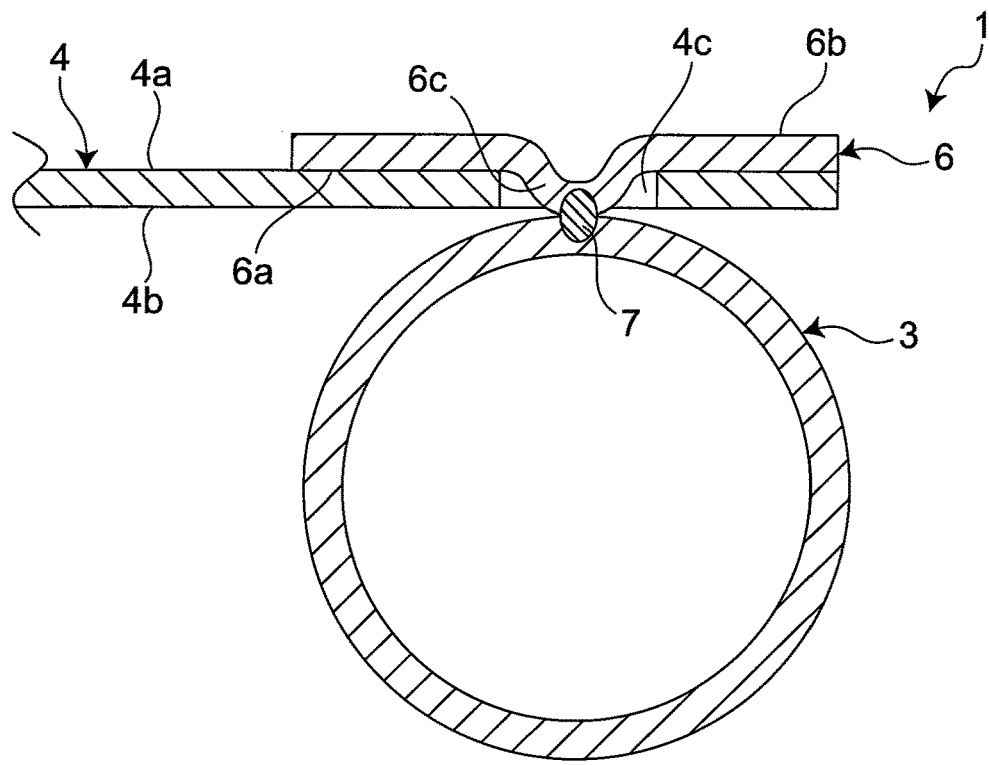
FIG. 15 is a cross-sectional view, similar to FIG. 2, of a frame structure according to a third modification of the first embodiment.
Figure 16:
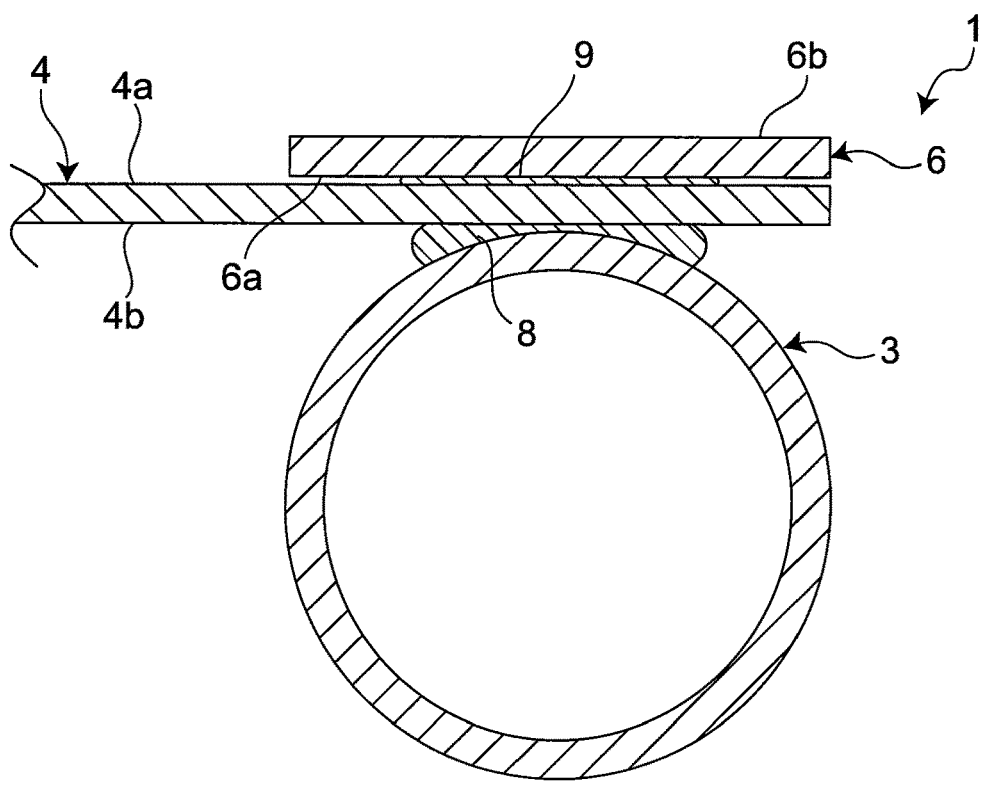
FIG. 16 is a cross-sectional view, similar to FIG. 3, of the frame structure according to the third modification of the first embodiment.
Figure 17:
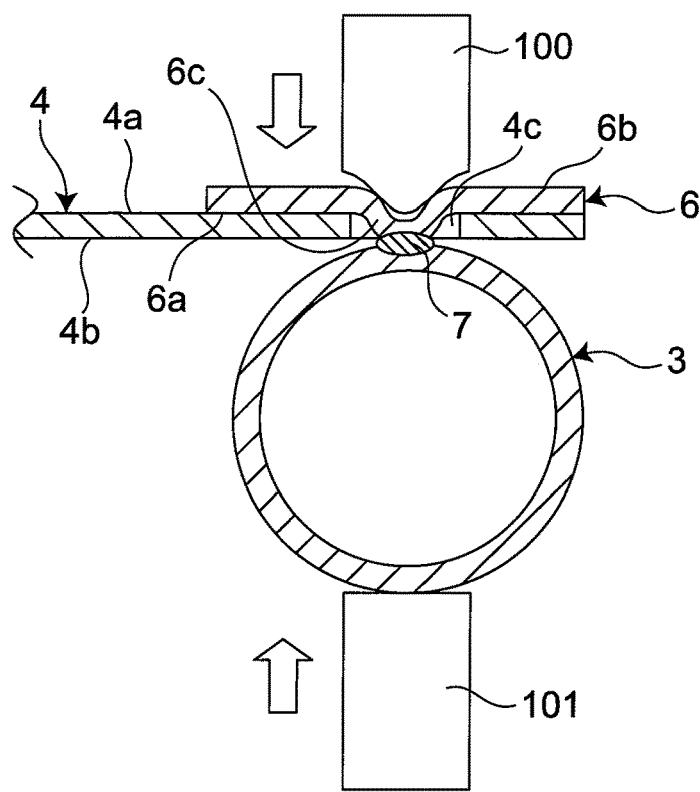
FIG. 17 is a cross-sectional view for describing resistance spot welding in the third modification of the first embodiment.

In a third modification shown in FIGS. 15 and 16, instead of the steel plate frame 2, the thin plate 4 is joined to a steel pipe 3 (circular steel pipe) whose cross section orthogonal to the longitudinal direction has a circular shape. The welded spot 7 is formed between each of the projections 6c of the support plate 6 and a portion of an outer peripheral surface of the steel pipe 3. Further, the surface 4b on the lower side in the drawings of the thin plate 4 and the portion of the outer peripheral surface of the steel pipe 3 are bonded to each other by the adhesive layers 8. As conceptually shown in FIG. 17, in a case where the welded spot 7 is formed by the spot resistance welding, one electrode 100 is disposed at a position on the surface 6b of the reinforcing plate 6 corresponding to the projection 6c, and the other electrode 101 is disposed at a position on the outer peripheral surface of the steel pipe 3 opposite to the projection 6c.

The second and third embodiments of the present invention will now be described. In the drawings related to these embodiments, the same or the same components as in the first embodiment are denoted by the same symbols. Further, a frame structure 1 and a method for joining dissimilar materials for manufacturing the frame structure 1 in these embodiments are the same as in the first embodiment in points of which no particular description is given.

Second Embodiment

FIGS. 18 to 21 show a frame structure 1 manufactured by a method for joining dissimilar materials according to the second embodiment of the present invention.

In the present embodiment, a thin plate 5 made of aluminum or an aluminum alloy is joined to a steel pipe 3 (rectangular steel pipe) whose cross section orthogonal to the longitudinal direction has a rectangular shape. The steel pipe 3 includes a top wall 3a, side walls 3b, 3c, and a bottom wall 3d.

The thin plate 4 in the first embodiment is simply flat (see, for example, FIG. 1). On the other hand, the thin plate 5 in the present embodiment is formed of a flat thin plate whose end is bent. Specifically, the thin plate 5 includes a main body 5a (second portion) having a flat-plate shape and an end 5b that has a flat-strip shape and is connected to the main body 5a with a bent portion 5c interposed between the main body 5a and the end 5b. A virtual plane including the main body 5a is different from a virtual plane including the end 5b. That is, the main body 5a and the end 5b extend on different virtual planes. In other words, the main body 5a and the end 5b are formed so as not to be flush with each other.

A portion of the main body 5a of the thin plate 5 adjacent to the bent portion 5c is placed on the outer surface of the top wall 3a of the steel pipe 3. Further, the end 5b of the thin plate 5 is placed on the outer surface of the side wall 3b of the steel pipe 3. Furthermore, a support plate 6 is placed on a surface 5f on an outer side of the end 5b of the thin plate 5.

In the end 5b of the thin plate 5, a plurality of (in the present embodiment, five) through holes 5h penetrating the end 5b from one surface 5f to the other surface 5g are formed spaced apart from one another. These through holes 5h are arranged on a straight line extending in the longitudinal direction of the steel pipe 3. No through hole penetrating the main body 5a from a surface 5d to a surface 5e is formed in the main body 5a of the thin plate 5.

On the support plate 6, a plurality of (in the present embodiment, five) projections 6c projecting from a surface 6a placed on the end 5 of the thin plate 5 are formed spaced apart from each other in the longitudinal direction. Each of the projections 6c is inserted into a corresponding one of the through holes 5h to bring the tip of the projection 6c into contact with the outer surface of the side wall 3b of the steel pipe 3. A welded spot 7 is formed between the tip of each of the projections 6c and the side wall 3b of the steel pipe 3. In other words, the support plate 6 is joined to the side wall 3b of the steel pipe 3 by the welded spots 7 with the end 5b of the thin plate 5 sandwiched between the support plate 6 and the side wall 3b of the steel pipe 3.

Figure 19:
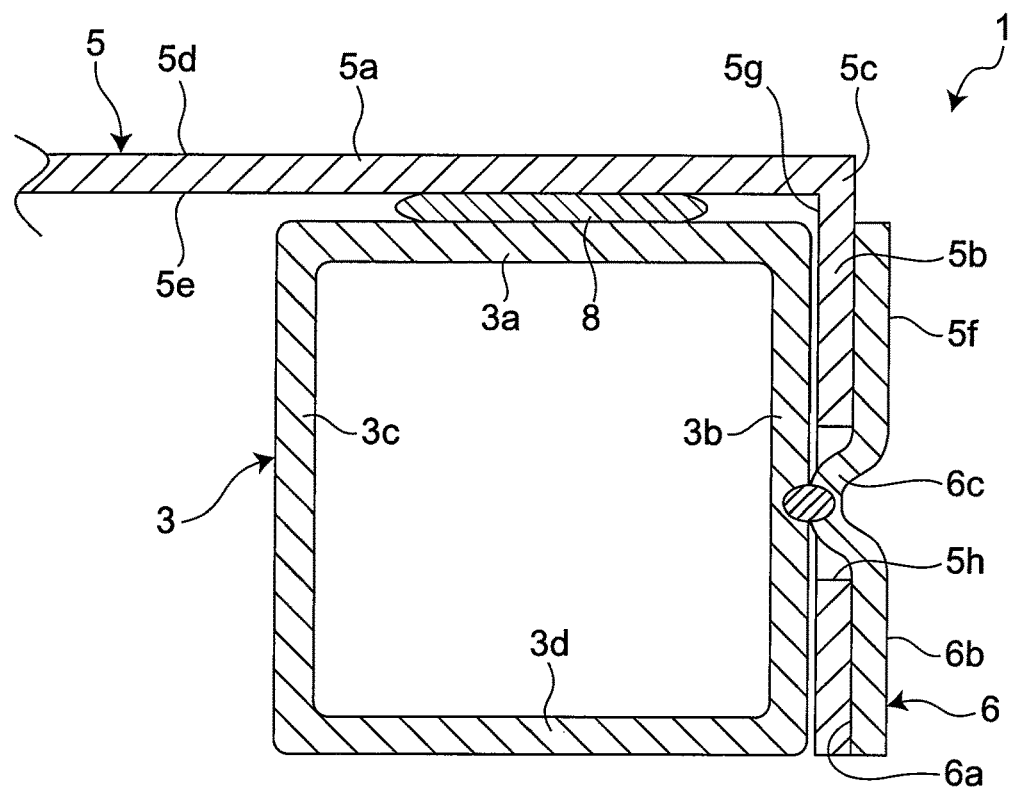
FIG. 19 is a cross-sectional view taken along line XIX-XIX of FIG. 18.
Figure 20:
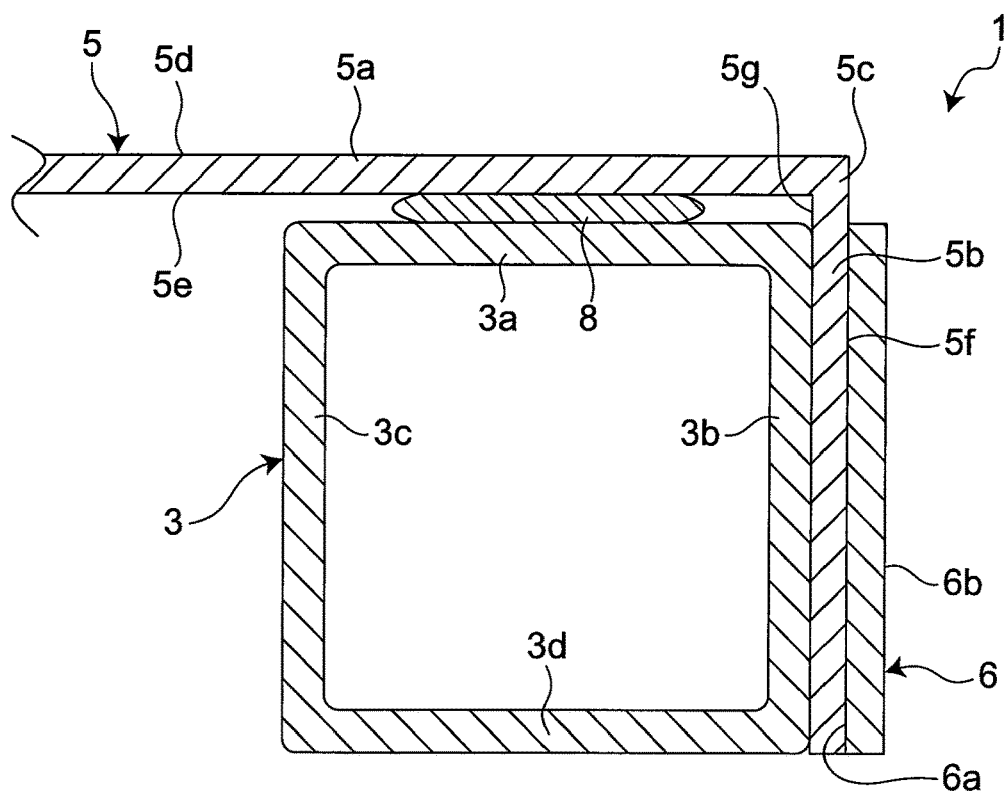
FIG. 20 is a cross-sectional view taken along line XX-XX of FIG. 18.
Figure 21:
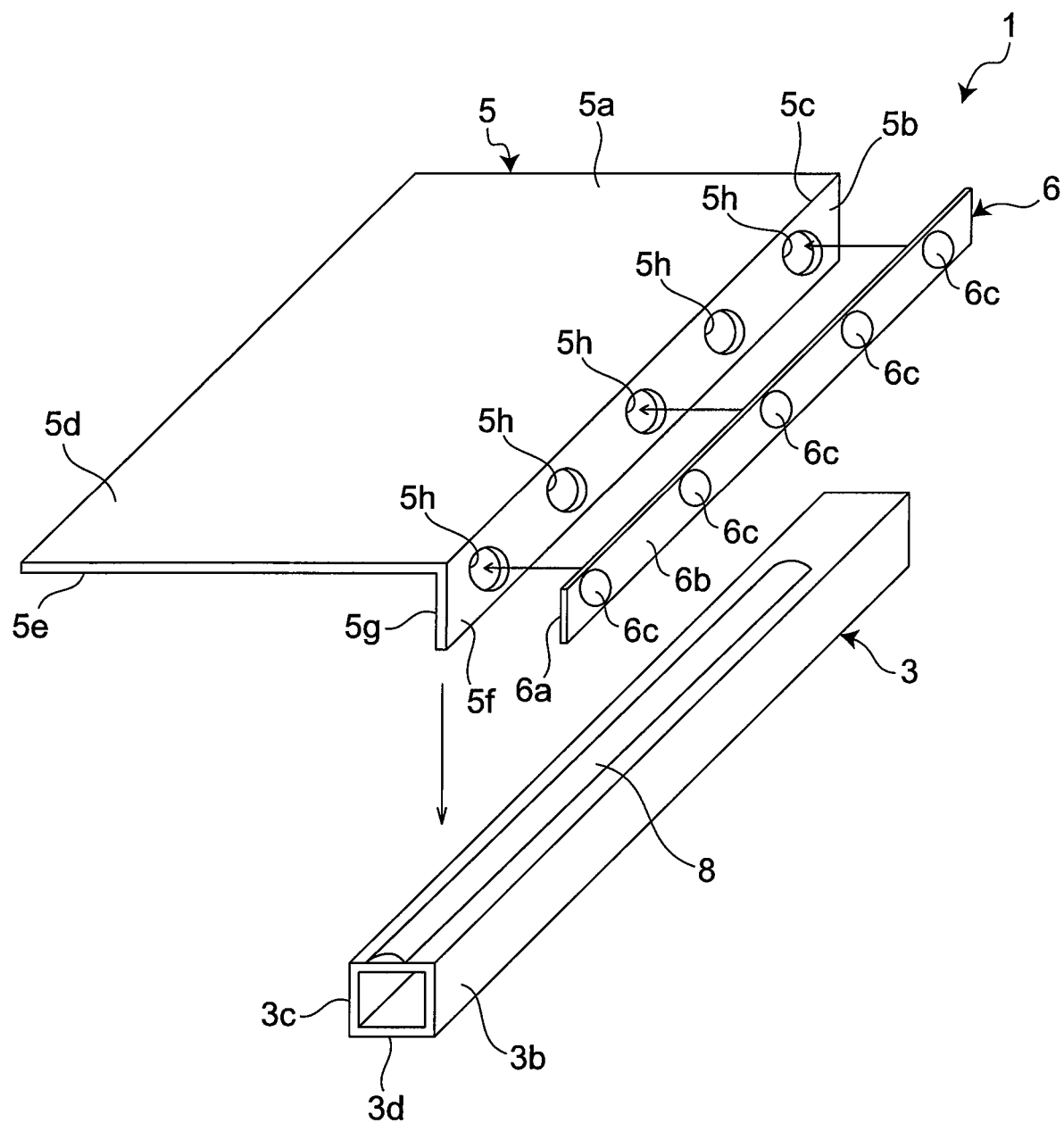
FIG. 21 is an exploded perspective view of the frame structure of FIG. 18.

Referring to FIGS. 19 to 21, an adhesive layer 8 is formed between the outer surface of the top wall 3a of the steel pipe 3 and a surface 5e on the lower side in the drawings of the main body 5b of the thin plate 5. The surface 5e of the main body 5b of the thin plate 5 and the outer surface of the top wall 3a of the steel pipe 3 are bonded to each other by the adhesive layer 8 (first adhesive). Referring to FIG. 21, since no through hole is formed in the main body 5a of the thin plate 5 as described above, the adhesive layer 8 is not divided, but formed continuously in the longitudinal direction of the steel pipe 3.

The frame structure 1 of the present embodiment has the following features.

The end 5b of the thin plate 5 is pressed, between the welded spots 7 adjacent to each other, continuously or widely against the steel pipe 3 by the support plate 6. This reduces stress concentration around each of the welded spots 7.

Pressing the end 5b continuously or widely against the steel pipe 3 with the support plate 6 between the welded spots 7 adjacent to each other prevents the thin plate 5 from undergoing out-of-plane deformation. Further, the main body 5a of the thin plate 5 is bonded to the steel pipe 3 by the adhesive layer 8. This also reduces the stress concentration around the each of the welded spots 7.

The above stress concentration reduction makes the thin plate 5 less susceptible to fracture from a portion joined to the steel frame 2 when a load is applied to the thin plate 5 and thus makes it possible to increase a joining strength between the steel pipe 3 and the thin plate 5. That is, although a weight of the frame structure 1 is reduced by a combination of the steel pipe 3 and the thin plate 5 made of aluminum or an aluminum alloy, sufficient rigidity is secured.

The thin plate 5 includes the end 5b, and the main body 5a that is not flush with the end 5b, and the main body 5a having no through hole is bonded to the steel pipe 3 by the adhesive layer 8. This allows a bonding surface constituted by the adhesive layer 8 to be continuous to increase a bonding area, and thus makes it possible to reduce stress concentration around each of the welded spots 7 more effectively and further increase the joining strength between the steel pipe 3 and the thin plate 5.

As in the first embodiment, an adhesive layer (see, for example, symbol 9 in FIG. 3) may be formed between the surface 5f on the outer side of the end 5b of the thin plate 5 and the surface 6a of the reinforcing plate 6 where the projections 6c are formed. Bonding the support plate 6 to the end 5b of the thin plate 5 with this adhesive makes it possible to reduce stress concentration around each of the welded spots 7 more effectively and further increase the joining strength between the steel plate frame 2 and the thin plate 4.

Next, a description will be given of a method for joining dissimilar materials according to the present embodiment.

The through holes 5h are formed, by a process such as stamping, in a portion, corresponding to the end 5b, of the thin plate 5 that is entirely flat before the bent portion 5c is formed. After the through holes 5h are formed, the thin plate 5 is bent to have the main body 5a, the bent portion 5c, and the end 5b.

The projections 6c are formed on the support plate 6. As described in relation to the first embodiment, the projections 6c may be formed by deep drawing or bulging, or by a different process such as forging or cutting.

The process of machining the thin plate 5 and the process of forming the projections 6c on the support plate 6 may be performed sequentially in that order or reverse order. Further, the two processes may be performed simultaneously or in parallel.

Next, the adhesive (first adhesive) is applied to the outer surface of the top wall 3a of the steel pipe 3 to form the adhesive layer 8. The adhesive may be applied to a portion of the surface 5e on the lower side in the drawings of the main body 5a of thin plate 5 to be placed on the outer surface of the top wall 3a of the steel pipe 3 to form the adhesive layer 8.

After the adhesive layer 8 is formed, the thin plate 5 is placed on the steel pipe 3. Specifically, a portion of the main body 5a of the thin plate 5 adjacent to the bent portion 5c is placed on the outer surface of the top wall 3a of the steel pipe 3, and the steel pipe 3 and the main body 5a of the thin plate 5 are bonded to each other by the adhesive layer 8. Further, the end 5b of the thin plate 5 is placed on the side wall 3b of the steel pipe 3.

Next, the surface 6a of the support plate 6 is placed on the surface 5f on the outer side of the end 5b of the thin plate 5 placed on the side wall 3a of the steel pipe 3. At this time, each of the projections 6 of the support plate 6 is inserted into a corresponding one of the through holes 5h of the end 5b of the thin plate 5.

Figure 22:
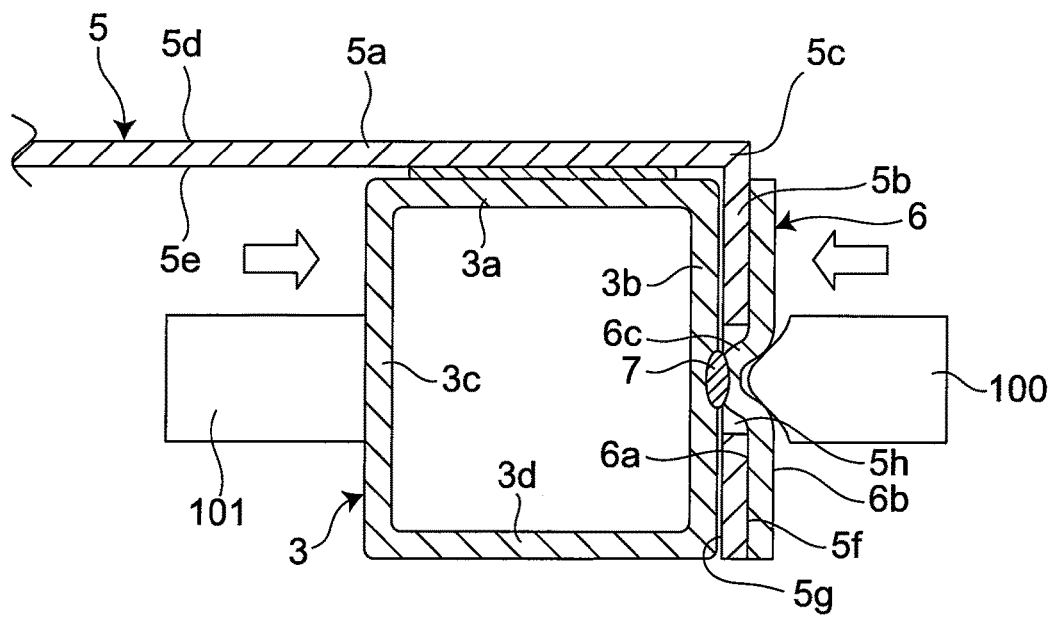
FIG. 22 is a cross-sectional view for describing resistance spot welding in the second embodiment.
Figure 23:
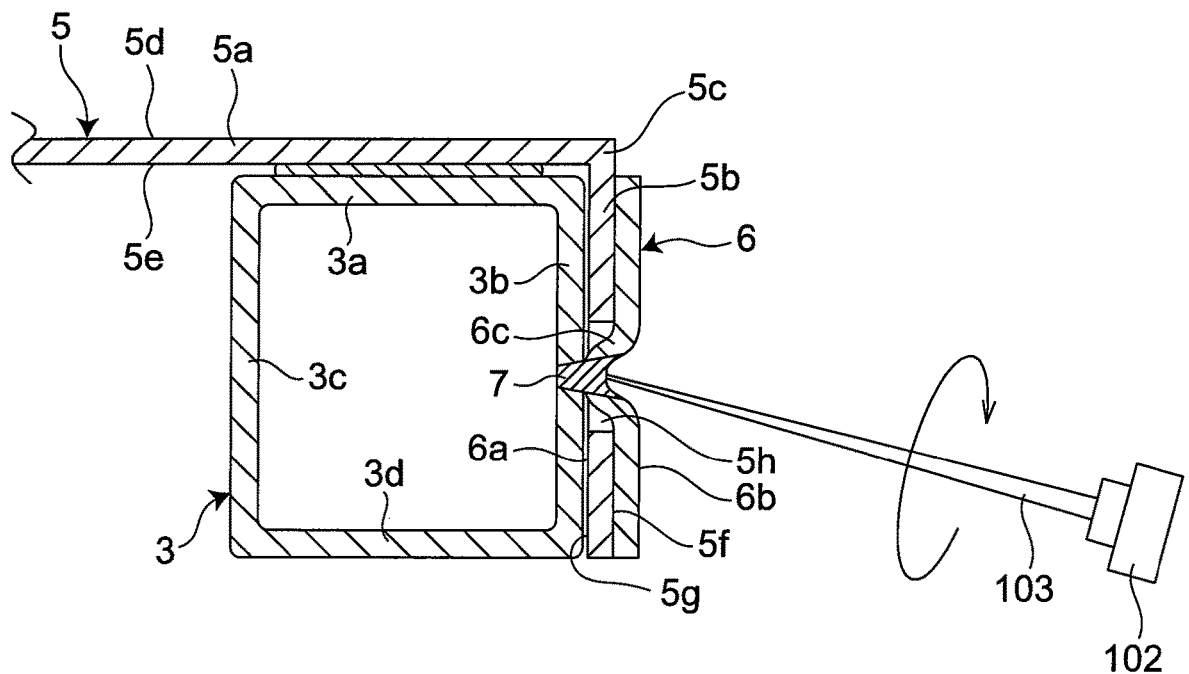
FIG. 23 is a cross-sectional view for describing laser welding in the second embodiment.

Subsequently, the projections 6a of the support plate 6 are welded to the side wall 3b of the steel pipe 3. Examples of this welding include resistance spot welding (see FIG. 22), laser welding (see FIG. 23), arc welding, and laser arc welding. Referring to FIG. 22, for the resistance spot welding, a portion, corresponding the projection 6a, of the support plate 6 and a portion, opposite to the projection 6a, of the bottom wall 3d of the steel pipe 3 are sandwiched between electrodes 100, 101.

Figure 18:
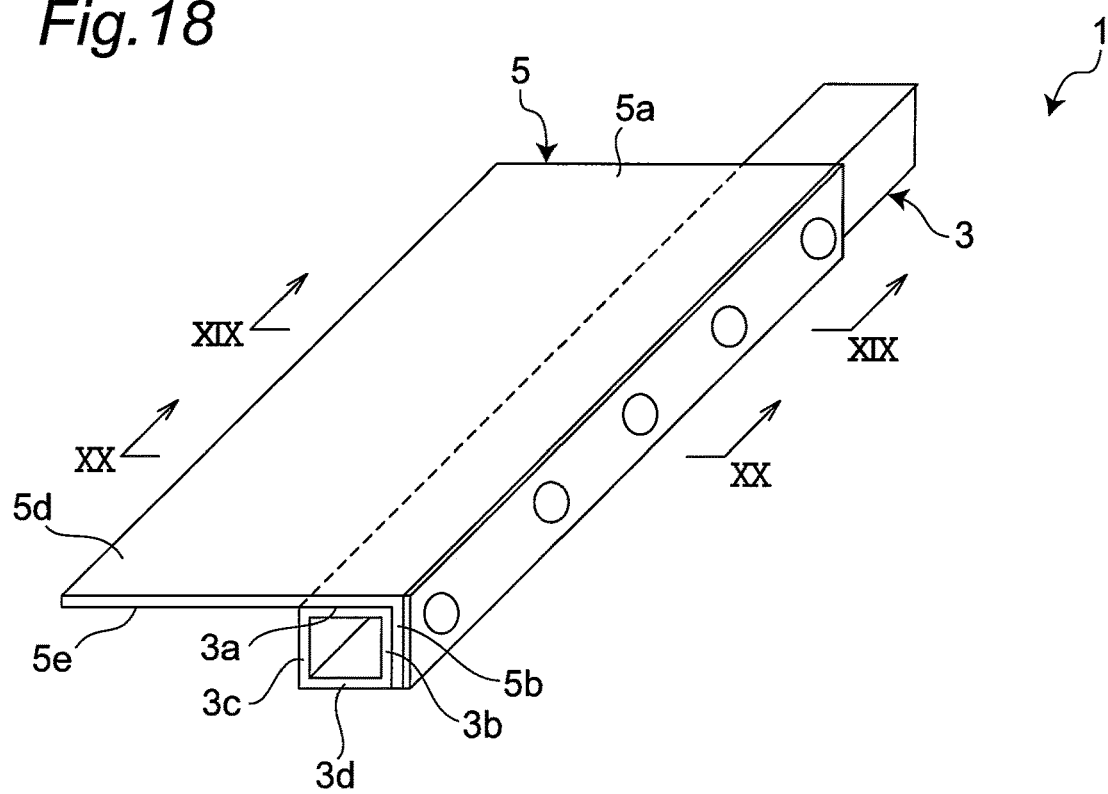
FIG. 18 is a schematic perspective view of a frame structure manufactured by a method for joining dissimilar materials according to a second embodiment.

Through the above processes, the frame structure 1 shown in FIG. 18 is manufactured.

FIGS. 24 to 30 show modifications of the second embodiment.

Figure 24:
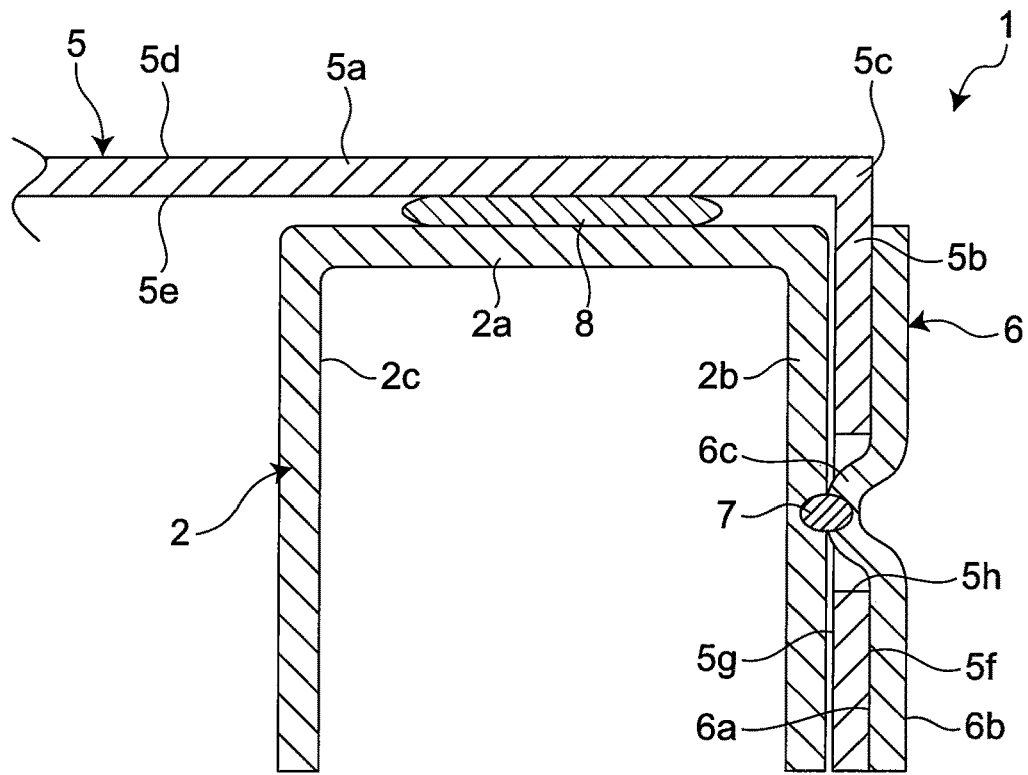
FIG. 24 is a cross-sectional view, similar to FIG. 19, of a frame structure according to a first modification of the second embodiment.
Figure 25:
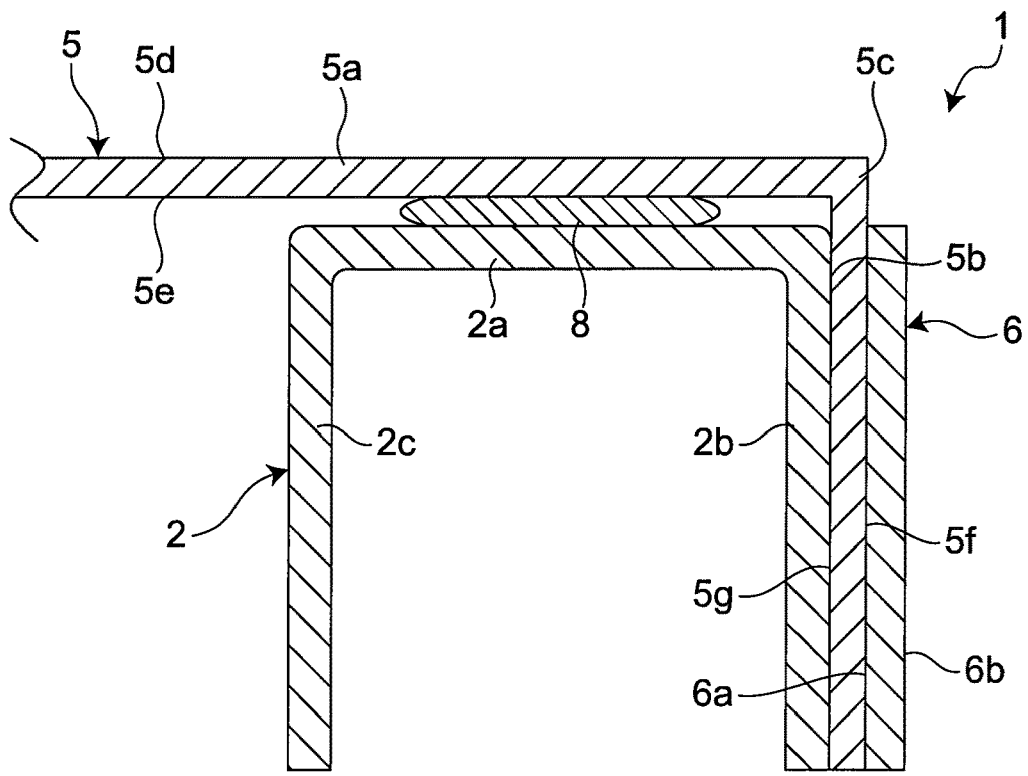
FIG. 25 is a cross-sectional view, similar to FIG. 20, of the frame structure according to the first modification of the second embodiment.

In a first modification shown in FIGS. 24 and 25, the thin plate 5 is joined to a steel plate frame 2 having a U shape. The main body 5a of the thin plate 5 is placed on a top wall 2a of the steel plate frame 2 and bonded to the top wall 2a by the adhesive layer 8. The end 5b of the thin plate 5 is placed on a side wall 2b of the steel plate frame 5. Forming the welded spot 7 between each of the projections 6a of the support plate 6 placed on the end 5b of the thin plate 5 and the side wall 2b of the steel plate frame 5 causes the end 5b of the thin plate 5 to be held between the side wall 2b of the steel plate frame 5 and the support plate 6.

Figure 26:
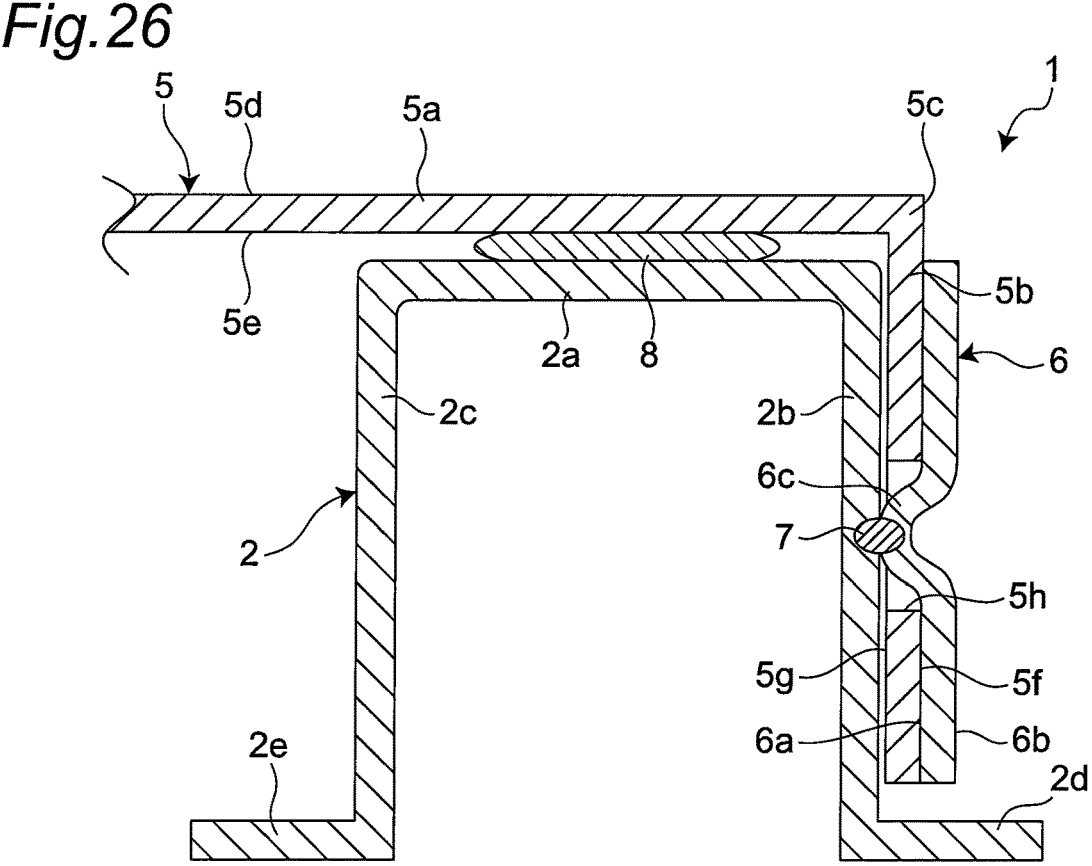
FIG. 26 is a cross-sectional view, similar to FIG. 19, of a frame structure according to a second modification of the second embodiment.
Figure 27:
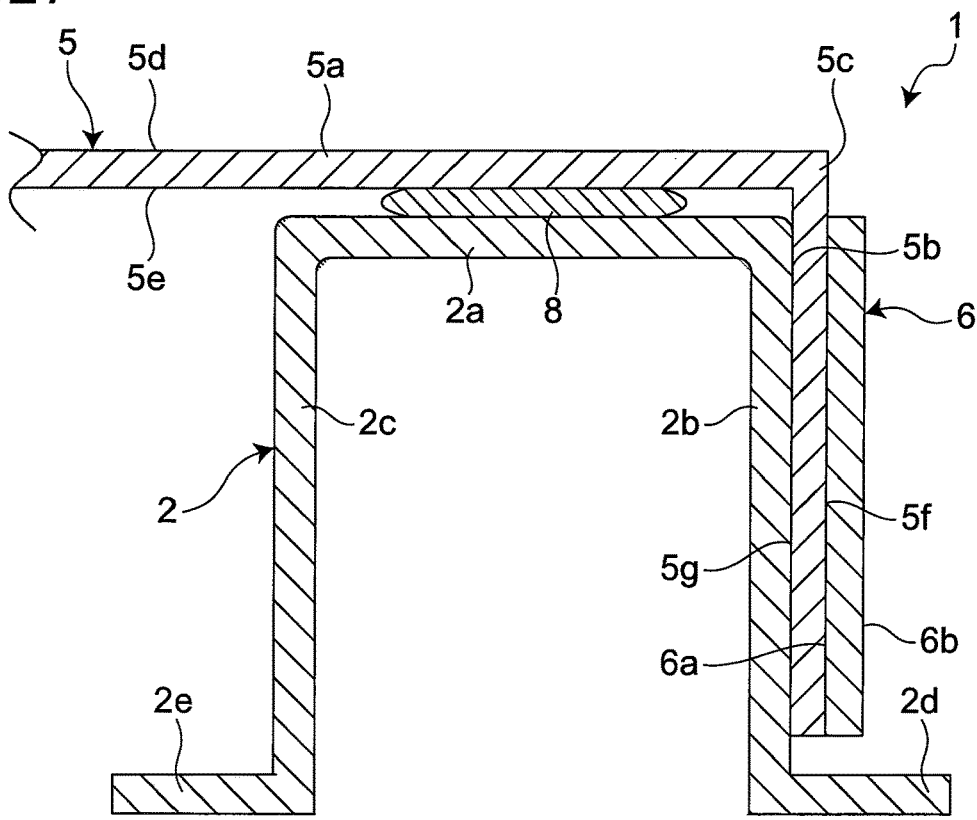
FIG. 27 is a cross-sectional view, similar to FIG. 20, of the frame structure according to the second modification of the second embodiment.

In a second modification shown in FIG. 26 and FIG. 27, the thin plate 5 is joined to a steel plate frame 2 having a hat shape. This modification is the same as the first modification (FIGS. 24 and 25) except the cross-sectional shape of the frame steel plate 2.

Figure 28:
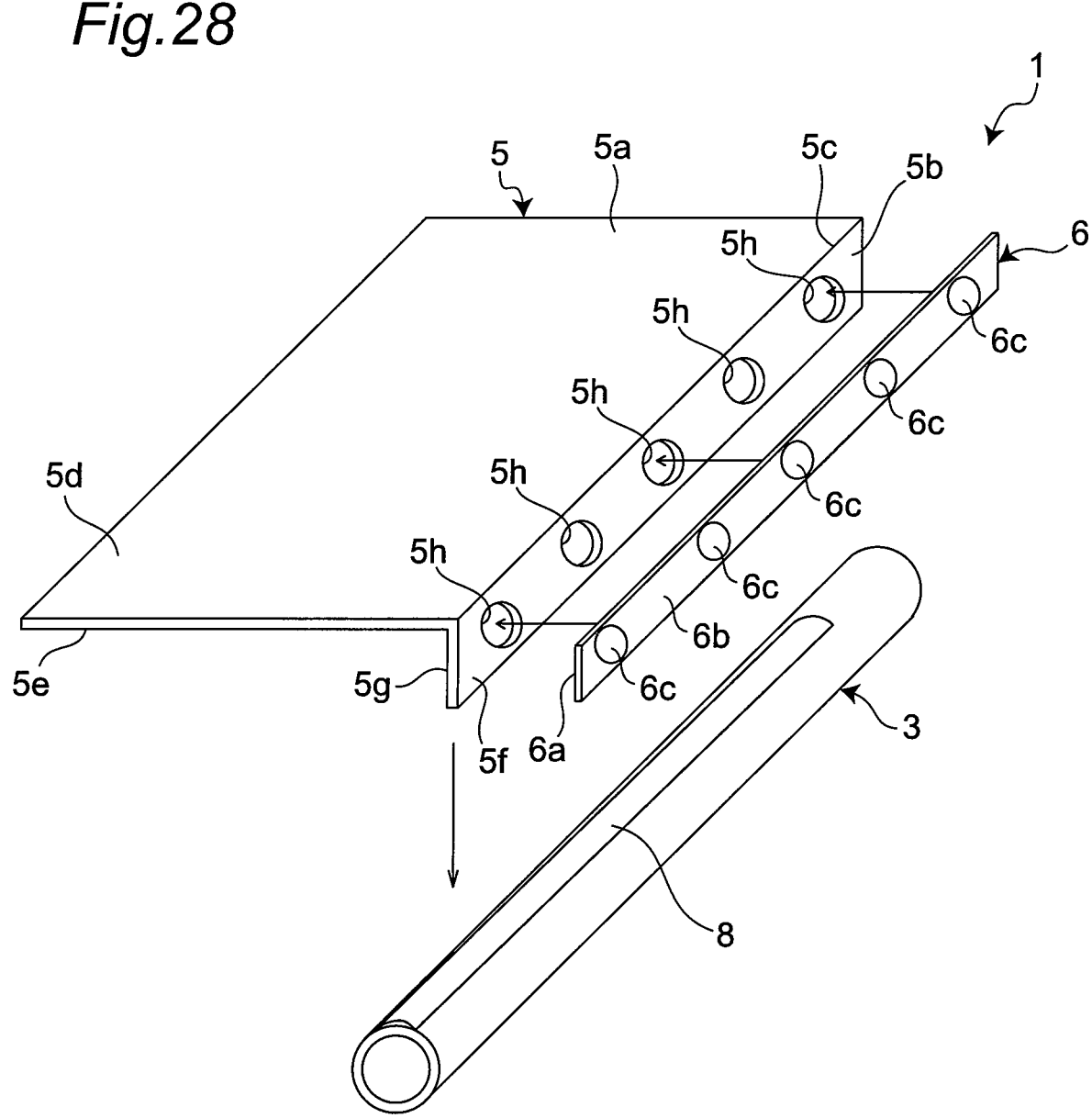
FIG. 28 is an exploded perspective view of a frame structure according to a third modification of the second embodiment.
Figure 29:
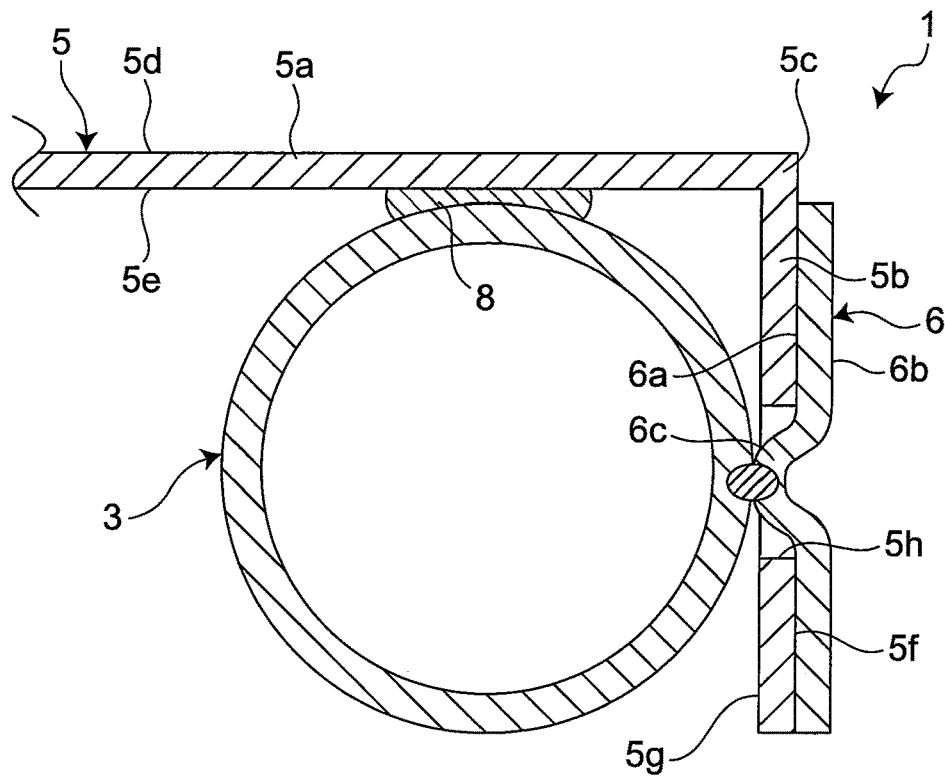
FIG. 29 is a cross-sectional view, similar to FIG. 19, of the frame structure according to the third modification of the second embodiment.
Figure 30:
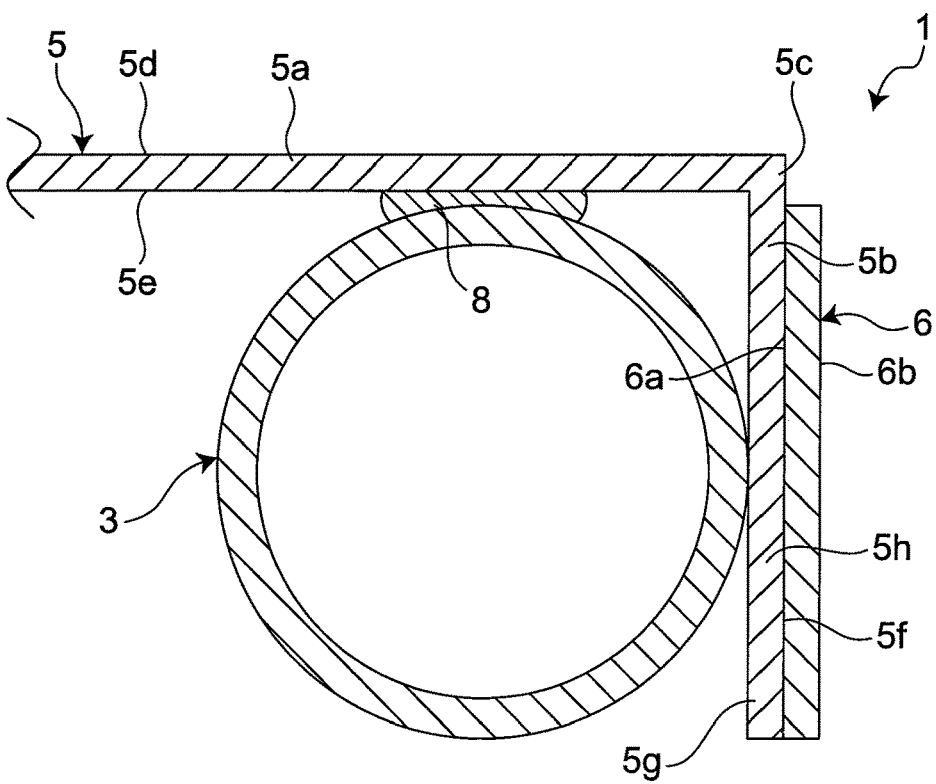
FIG. 30 is a cross-sectional view, similar to FIG. 20, of the frame structure according to the third modification of the second embodiment.
Figure 31:
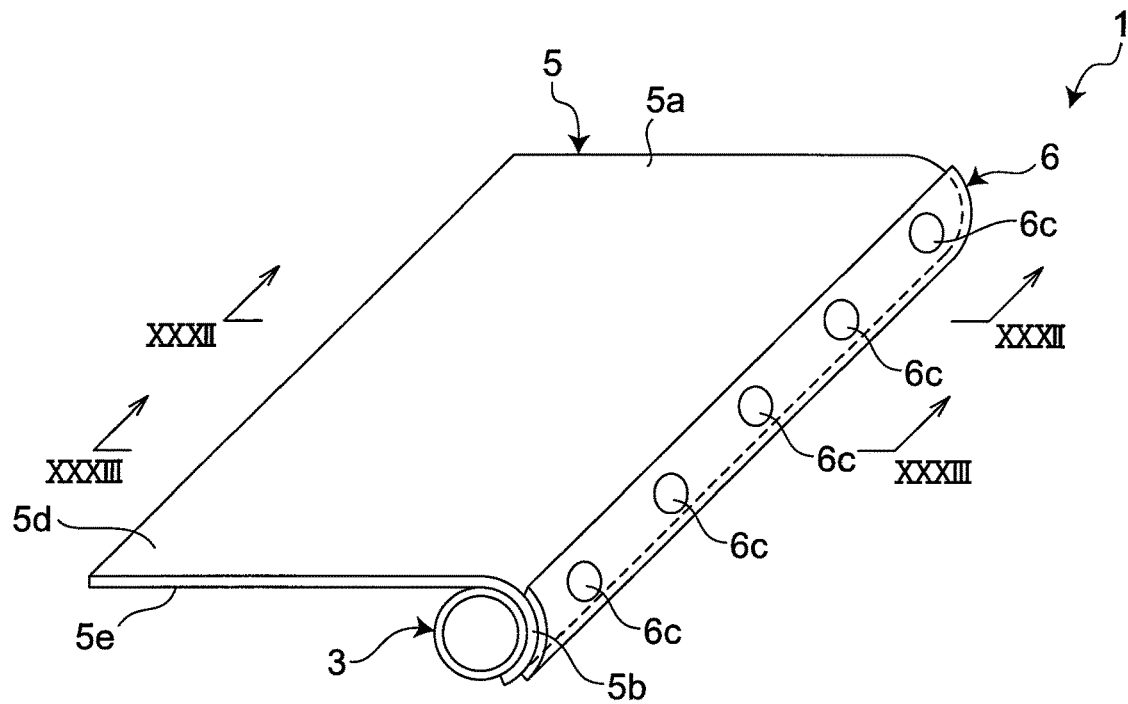
FIG. 31 is a schematic perspective view of a frame structure manufactured by a method for joining dissimilar materials according to a third embodiment.
Figure 32:
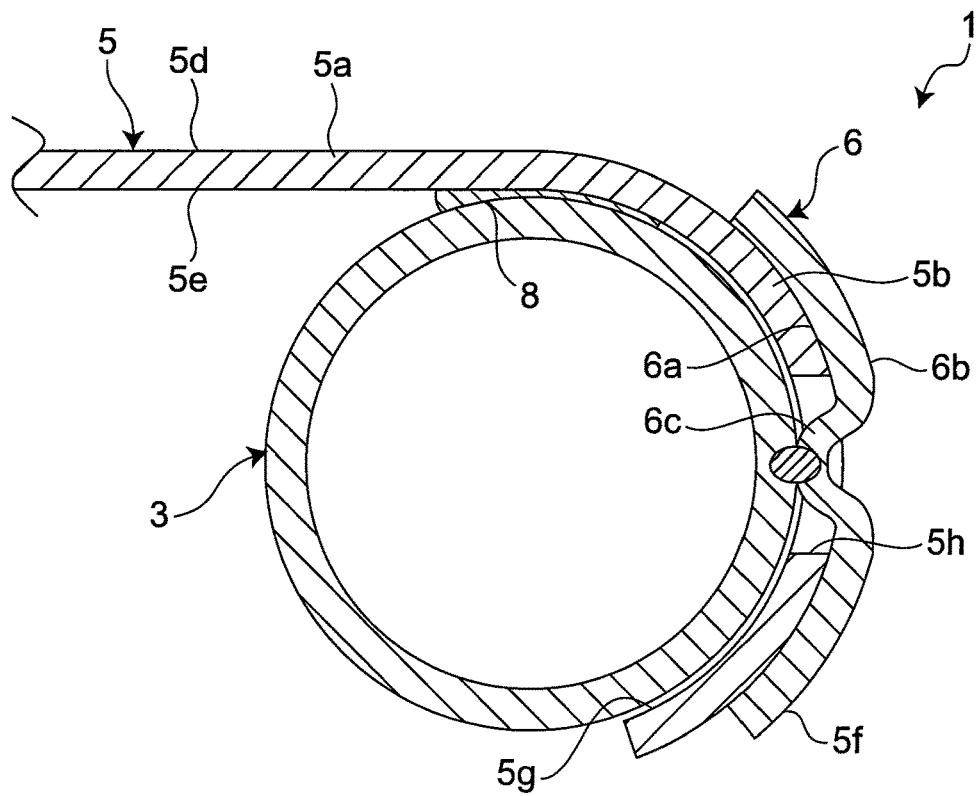
FIG. 32 is a cross-sectional view taken along line XXXII-XXII of FIG. 31.
Figure 33:
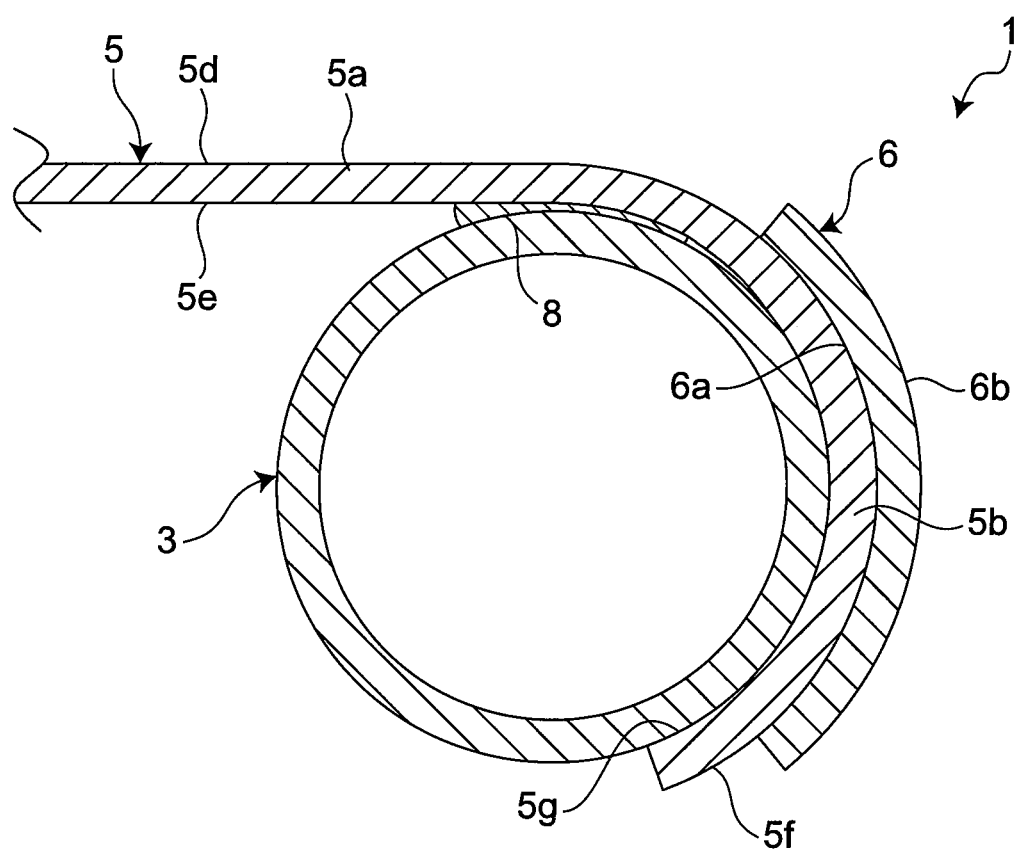
FIG. 33 is a cross-sectional view taken along line XXXIII-XXXIII of FIG. 31.
Figure 34:
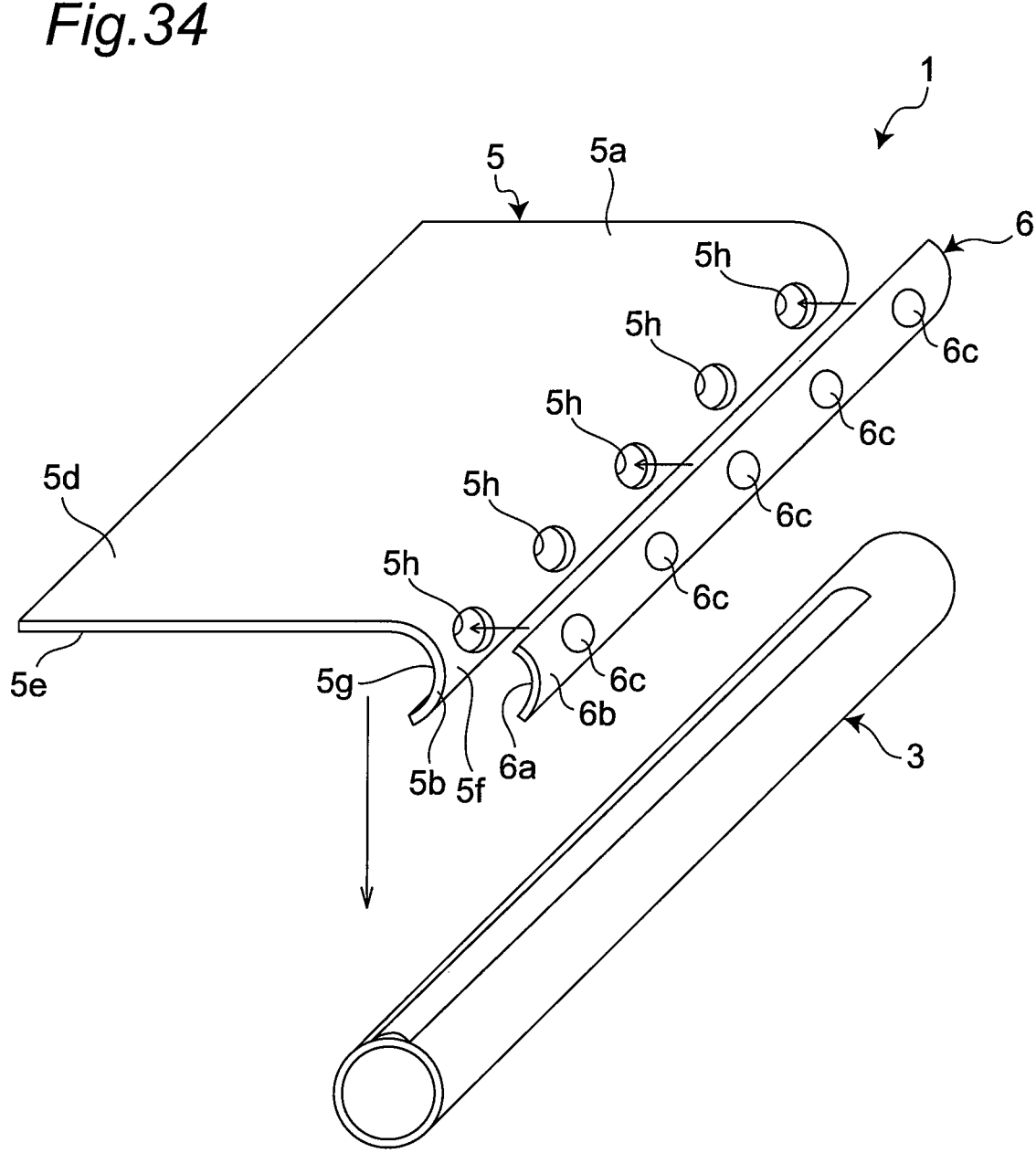
FIG. 34 is an exploded perspective view of the frame structure of FIG. 31.

In a third modification shown in FIGS. 28 to 30, the thin plate 5 is joined to a steel pipe 3 having a circular shape. The main body 5a of the thin plate 5 is placed on a portion of the steel pipe 3 and bonded to the steel pipe 3 by the adhesive layer 8. The end 5b of the thin plate 5 is placed on a portion of the steel pipe 3 that is different from the portion where the adhesive layer 8 is formed. Forming the welded spot 7 between each of the projections 6a of the support plate 6 placed on the end 5b of the thin plate 5 and the steel pipe 3 causes the end 5b of the thin plate 5 to be held between the steel pipe 3 and the support plate 6.

Third Embodiment

FIGS. 31 to 34 show a frame structure 1 manufactured by a method for joining dissimilar materials according to the second embodiment of the present invention.

In the present embodiment, a thin plate 5 made of aluminum or an aluminum alloy is joined to a steel pipe 3 (circular steel pipe) whose cross section orthogonal to the longitudinal direction has a circular shape.

The thin plate 5 in the present embodiment is formed of a flat thin plate whose end is curved. Specifically, the thin plate 5 includes a main body 5a (second portion) having a flat-plate shape and an end 5b (first portion) that has a curved-plate shape and is connected to the main body 5a. As in the second embodiment, in other words, the main body 5a and the end 5b are formed so as not to be flush with each other. The end 5 is formed such that at least a surface 5g on an inner side is a curved surface having a curvature along a contour of the steel pipe 3.

A portion of the main body 5a of the thin plate 5 adjacent to the end 5b having a curved shape is placed on a portion on an upper side in the drawings of an outer surface of the steel pipe 3. The end 5b of the thin plate 5 is further placed on a portion on a right side in the drawings of the outer surface of the steel pipe 3. Furthermore, a support plate 6 is placed on a surface 5f on an outer side of the end 5b of the thin plate 5.

The support plate 6 in the present embodiment does not have a simple flat-strip shape. Specifically, the support plate 6 is formed such that a cross section orthogonal to the longitudinal direction of at least a surface 6a on which projections 6a are formed has an arc shape having a curvature along the end 5b of the thin plate 5.

Each of the projections 6c of the support plate 6 is inserted into a corresponding one of through holes 5h of the end 5b of the thin plate 5 to bring the tip of the projection 6c into contact with the outer surface of the steel pipe 3. A welded spot 7 is formed between the tip of each of the projections 6c and the outer surface of the steel pipe 3. In other words, the support plate 6 is joined to a side wall 3b of the steel pipe 3 by the welded spots 7 with the end 5b of the thin plate 5 sandwiched between the support plate 6 and the steel pipe 3. Further, the outer surface of the steel pipe 3 and a surface 5e on the lower side in the drawings of the main body 5b of the thin plate 5 are bonded to each other by an adhesive layer 8.

The frame structure 1 of the present embodiment has the following features in addition to the features of the second embodiment.

Since the end 5b of the thin plate 5 has a curved-plate shape and extends along the contour of the steel pipe 3 having a circular shape, it is possible to effectively prevent moisture ingress into a gap between the end 5b of the thin plate 5 and the steel pipe 3. This in turn makes it possible to prevent electrical contact between the steel pipe 3 and the thin plate 5.

Since the cross section of the support plate 6 orthogonal to the longitudinal direction has an arc shape along the end 5b of the thin plate 5, it is possible to effectively prevent moisture ingress into a gap between the support plate 6 and the end 5b of the thin plate 5. This in turn makes it possible to prevent electrical contact between the support plate 6 and the thin plate 5. Further, the support plate 6 has no sharp edge projecting from the end 5b of the thin plate 5, and thus safety is increased.

As in the first embodiment, an adhesive layer (see, for example, symbol 9 in FIG. 3) may be formed between the surface 5f on the outer side of the end 5b of the thin plate 5 and the surface 6a of the reinforcing plate 6 where the projections 6c are formed. Bonding the support plate 6 to the end 5b of the thin plate 5 with this adhesive makes it possible to reduce stress concentration around each of the welded spots 7 more effectively and further increase the joining strength between the steel plate frame 2 and the thin plate 4.

Figure 35:
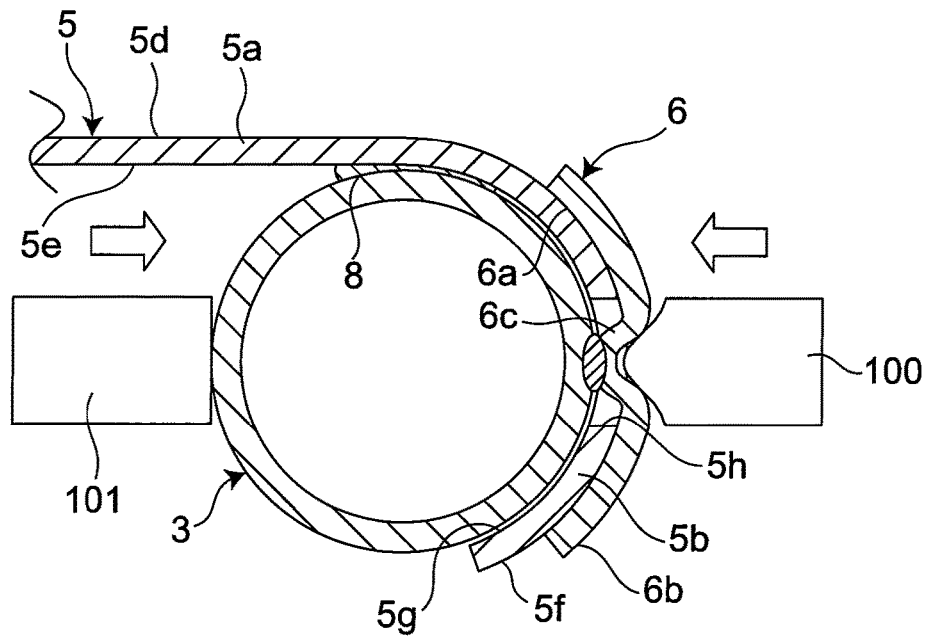
FIG. 35 is a cross-sectional view for describing resistance spot welding in the third embodiment.
Figure 36:
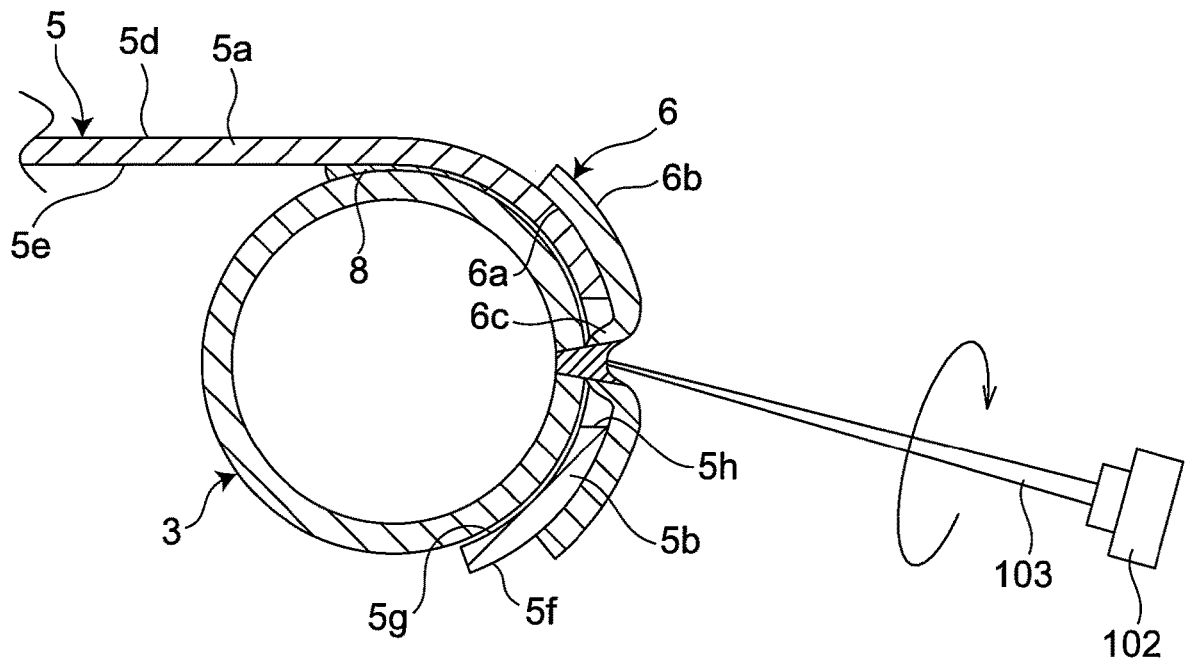
FIG. 36 is a cross-sectional view for describing laser welding in the third embodiment.

The method for joining dissimilar materials according to the present embodiment is the same as in the second embodiment except that the end 5b having a curved shape is formed in the thin plate 5 rather than the formation of the bent portion 5c and the end 5b having a flat shape (see, for example, FIG. 21), and that the support plate 6 is machined to have an arc-shaped cross section. Examples of the welding of the projections 6c of the support plate 6 to the steel pipe 3 include resistance spot welding (see FIG. 35), laser welding (see FIG. 36), arc welding, and laser arc welding as in the second embodiment.

Figure 37:
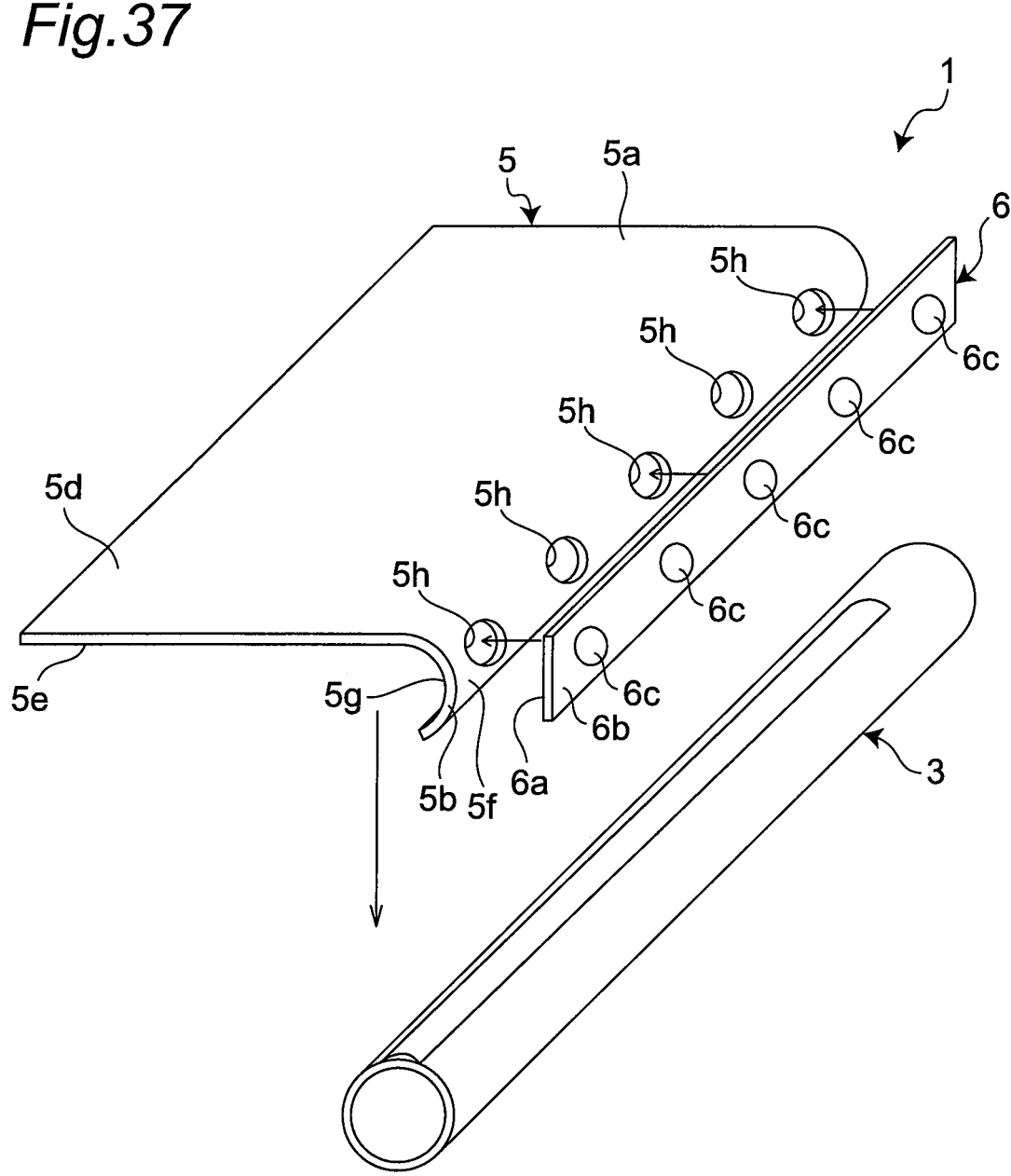
FIG. 37 is an exploded perspective view of a frame structure according to a modification of the third embodiment.
Figure 38:
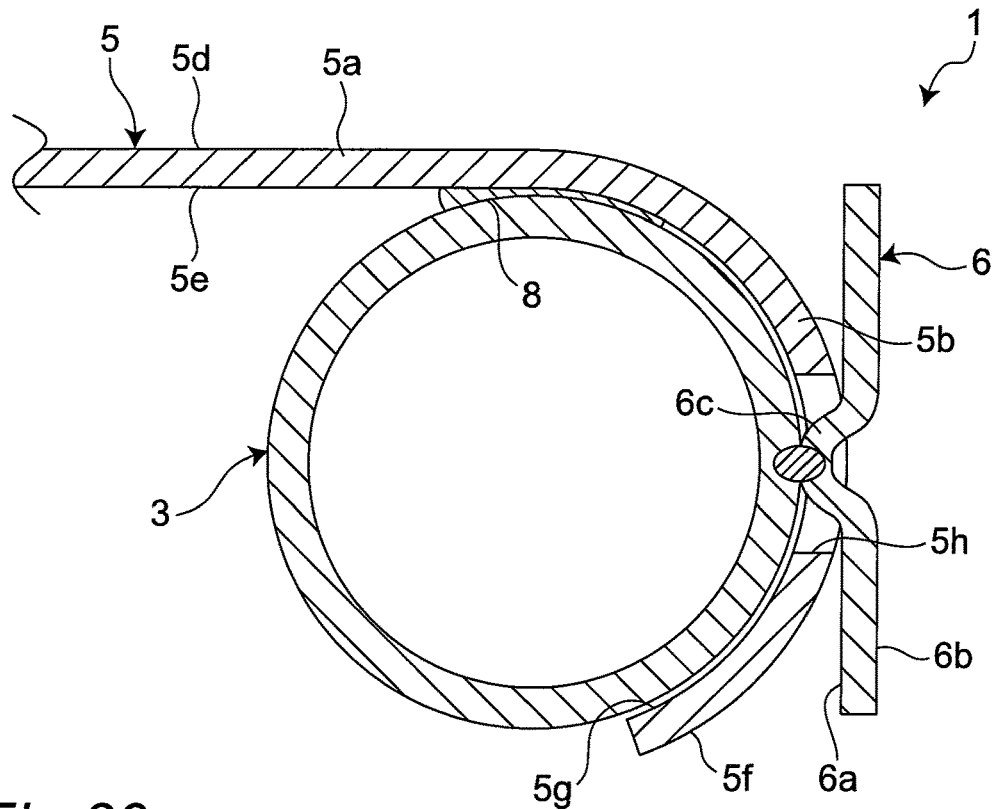
FIG. 38 is a cross-sectional view, similar to FIG. 32, of the frame structure according to the modification of the third embodiment.
Figure 39:
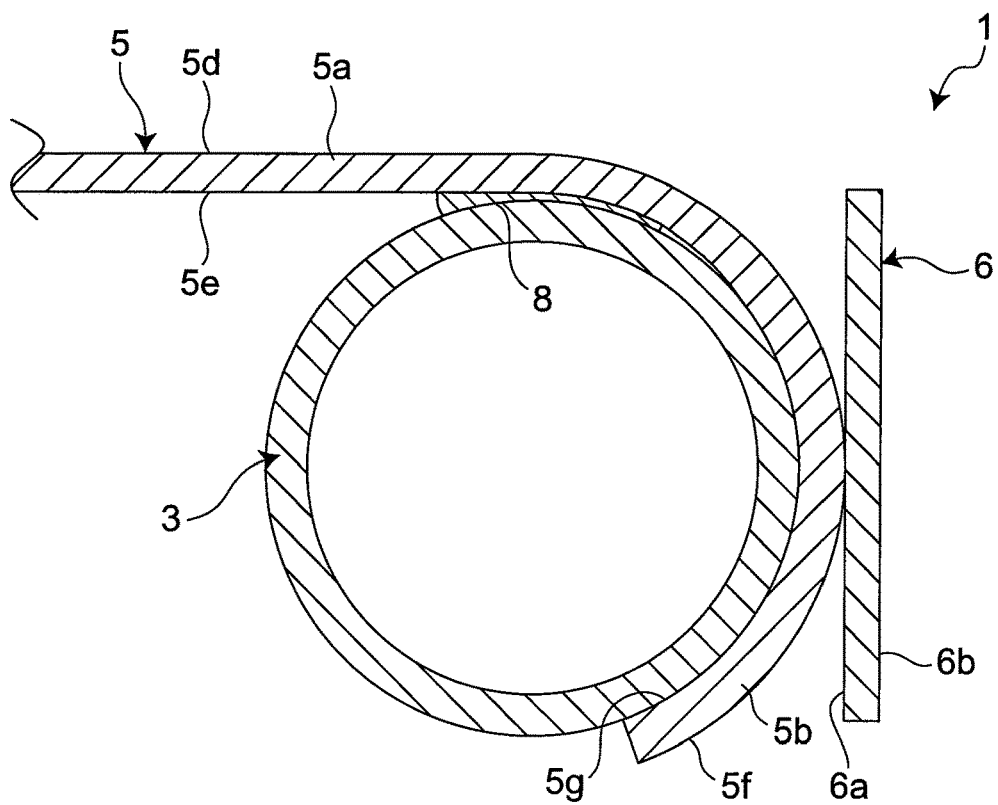
FIG. 39 is a cross-sectional view, similar to FIG. 33, of the frame structure according to the modification of the third embodiment.

In FIGS. 37 to 39, in a modification of the third embodiment, the cross section of the support plate 6 orthogonal to the longitudinal direction does not have an arc shape. That is, for example, as in the first embodiment, the cross section of the support plate 6 orthogonal to the longitudinal direction in this modification has a slender rectangular shape.

The present invention has been described with reference to an example where a thin plate made of aluminum or an aluminum alloy is joined to a steel frame or steel pipe. The present invention is, however, applicable to joining of dissimilar materials other than the combination of steel and aluminum or an aluminum alloy.

The invention claimed is:

1. A method for joining dissimilar materials for joining an overlap section between a first metal member and a second metal member different in material from the first metal member, the method comprising the steps of:
   forming a plurality of through holes in a portion of the second metal member to be placed on the first metal member;
   forming a plurality of projections on a support member, each of the plurality of projections being allowed to be inserted into a corresponding one of the through holes;
   applying a first adhesive to a portion of the first metal member on which the second metal member is placed or to a portion of the second metal member to be placed on the first metal member;
   placing the second metal member on the first metal member to bond the first metal member and the second metal member together with the first adhesive;
   thereafter, placing the support member on the second metal member to insert the plurality of projections into the through holes; and after completion of the above steps,
   welding each of the plurality of projections to the first metal member to form a plurality of welded spots, wherein
   at a single portion between adjacent two of the plurality of through holes, the first metal member and the second metal member are bonded with each other by the first adhesive.

2. The method for joining dissimilar materials according to claim 1, further comprising:
   applying a second adhesive to the second metal member or to the support member; and
   bonding the second metal member and the support member together with the second adhesive.

3. The method for joining dissimilar materials according to claim 1, wherein
   the first metal member is a long member whose cross section orthogonal to a longitudinal direction has a U shape, a hat shape, a rectangular shape, or a circular shape,
   the second metal member is a plate-shaped member, and
   the support member is a long strip-shaped member.

4. The method for joining dissimilar materials according to claim 3, wherein
   the first adhesive is applied to cause the first metal member and the second metal member to be bonded together in a section between the welded spots adjacent to each other.

5. The method for joining dissimilar materials according to claim 3, wherein
   the second metal member includes
   a first portion that is placed on the first metal member, in which the plurality of through holes are formed, and on which the support member is placed, and
   a second portion that is not flush with the first portion and is placed on a portion of the first metal member that is different from a portion on which the first portion is placed, and
   the first adhesive is applied to the portion of the first metal member on which the second portion is placed or to a portion of the second portion to be placed on the first metal member.

6. The method for joining dissimilar materials according to claim 5, wherein
   the first portion and the second portion each have a flat-plate shape, and
   the first portion and the second portion are connected to each other with a bent portion interposed between the first portion and the second portion.

7. The method for joining dissimilar materials according to claim 5, wherein
   a cross section of the first metal member orthogonal to the longitudinal direction has a circular shape,
   the first portion of the second metal member has a curved-plate shape along a contour of the first metal member, and
   the second portion of the second metal member has a flat-plate shape.

8. The method for joining dissimilar materials according to claim 7, wherein
   a cross section of the support plate orthogonal to the longitudinal direction has an arc shape along the first portion of the second metal member.

9. The method for joining dissimilar materials according to claim 1, wherein
   the first metal member is made of steel,
   the second metal member is made of aluminum or an aluminum alloy, and
   the support member is made of steel.

10. The method for joining dissimilar materials according to claim 1, wherein
    the first metal member and the projections of the support member are welded together by resistance spot welding, laser welding, arc welding, or laser arc welding.

11. The method for joining dissimilar materials according to claim 1, wherein
    the projections of the support member are formed by deep drawing, bulging, forging, or cutting.

12. A dissimilar-material joined body comprising:
    at least two first metal members that are each a long member made of steel and whose cross section orthogonal to a longitudinal direction has a U shape, a hat shape, a rectangular shape, or a circular shape;
a second metal member that is a thin plate made of aluminum or an aluminum alloy and is placed on each of the first metal members, a plurality of through holes are formed in the second metal member;
a support member that is made of steel and is placed on a portion of the second metal member placed on each of the first metal members, a plurality of projections are formed on the support member,
wherein a number and a spacing between the through holes and the projections are set before welding such that each of the projections aligns with a corresponding one of the through holes,
an adhesive layer that bonds each of the at least two first metal members and the second metal member together; and
a plurality of welded spots where each of the plurality of projections formed on the support member and inserted into a corresponding one of the plurality of through holes formed in the second metal member is welded to each of the at least two first metal members.

* * * * *